United States Patent [19]
Komma et al.

[11] Patent Number: 5,412,631
[45] Date of Patent: May 2, 1995

[54] OPTICAL HEAD APPARATUS FOR STORING, READING OR ERASING INFORMATION, AND OPTICAL INFORMATION REPRODUCING METHOD AND OPTICAL INFORMATION APPARATUS FOR OPTICALLY READING INFORMATION STORED IN AN OPTICAL MEMORY

[75] Inventors: Yoshiaki Komma, Kyoto; Seiji Nishino, Osaka; Makoto Kato, Nishinomiya, all of Japan

[73] Assignee: Matsushita Electric Industrial Co., Ltd., Osaka, Japan

[21] Appl. No.: 87,439

[22] Filed: Jul. 8, 1993

[30] Foreign Application Priority Data

Jul. 10, 1992 [JP] Japan .................. 4-183353

[51] Int. Cl.⁶ ........................................... G11B 7/135
[52] U.S. Cl. ................... 369/44.37; 369/44.12; 369/44.23; 369/44.41; 369/103; 369/109; 369/112
[58] Field of Search ............... 369/44.37, 44.41, 44.38, 369/44.42, 44.11, 44.12, 44.14, 44.23, 112, 109, 110, 103; 250/201.5

[56] References Cited

U.S. PATENT DOCUMENTS

| | | | |
|---|---|---|---|
| 4,731,772 | 3/1988 | Lee | 369/112 |
| 4,918,300 | 4/1990 | Tsuji et al. | 369/44.37 X |
| 4,929,823 | 5/1990 | Kato et al. | 250/201.5 |
| 4,945,529 | 7/1990 | Ono et al. | 369/109 |
| 5,049,732 | 9/1991 | Nagahama et al. | 369/44.37 X |
| 5,128,914 | 7/1992 | Kurata et al. | 369/44.37 |
| 5,231,620 | 7/1993 | Ohuchida | 369/44.37 X |

FOREIGN PATENT DOCUMENTS

| | | |
|---|---|---|
| 60-138748 | 7/1985 | Japan . |
| 61-131245 | 6/1986 | Japan . |
| 222452 | 5/1990 | Japan . |
| 2185722 | 7/1990 | Japan . |
| 4212730 | 8/1992 | Japan . |

*Primary Examiner*—Georgia Y. Epps
*Assistant Examiner*—Muhammad N. Edun
*Attorney, Agent, or Firm*—Lowe, Price, LeBlanc & Becker

[57] ABSTRACT

An optical head apparatus consists of a light beam source, a blazed hologram partitioned into diffraction regions for mainly changing the light beam radiated from the light beam source to zero-order diffraction light and secondarily diffracting the light beam to produce beams of unnecessary light such as N-order diffraction light ($N \neq 0$), an information medium for storing information, an objective lens for converging the zero-order diffraction light and the unnecessary light at the information medium, and a six-division photo detector having six detecting sections for detecting intensity of first-order diffraction light produced by diffracting the zero-order diffraction light in the blazed hologram. A hologram pattern of the blazed hologram is formed to function as a lens for the unnecessary light. A focus servo signal is produced according to mutual relation among intensities of the first-order diffraction light detected in the six detecting sections to focus the objective lens on the information medium For the zero-order diffraction light. Therefore, the objective lens is not focused on the information medium for the unnecessary light. Also, the beams of the unnecessary light diffracted in each of the diffraction regions of the blazed hologram are greatly widened because numerical apertures of the diffraction regions are small.

57 Claims, 18 Drawing Sheets

LITHOGRAPHY

DEVELOPMENT

RESIST STRIPPING

LITHOGRAPHY

DEVELOPMENT

RESIST STRIPPING

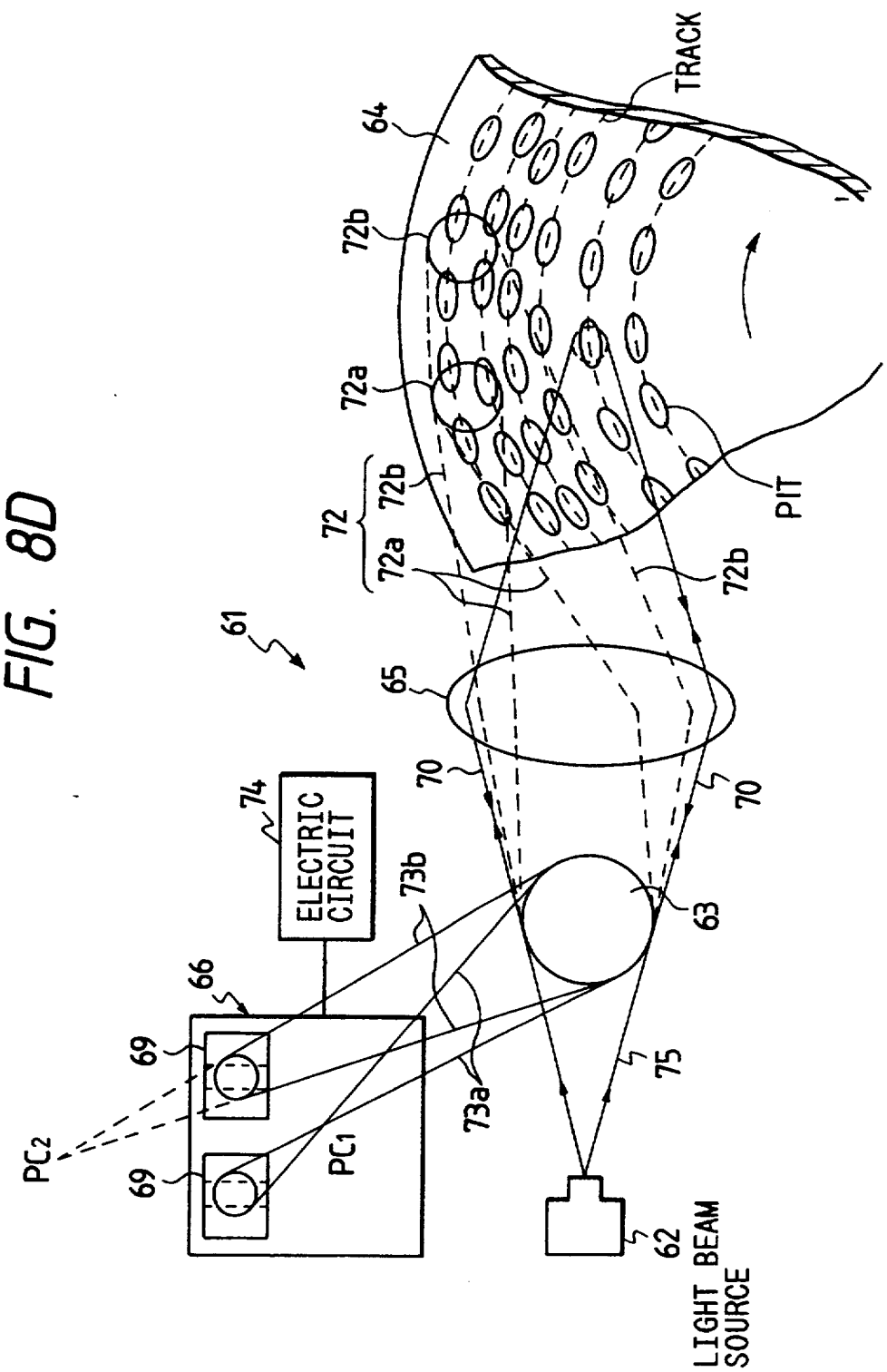

OPTICAL HEAD APPARATUS FOR STORING, READING OR ERASING INFORMATION, AND OPTICAL INFORMATION REPRODUCING METHOD AND OPTICAL INFORMATION APPARATUS FOR OPTICALLY READING INFORMATION STORED IN AN OPTICAL MEMORY

BACKGROUND OF THE INVENTION

1. Field of the Invention

The present invention relates to an optical head apparatus for storing information in a storage medium such as an optical medium or a magneto-optical medium like an optical disk or an optical card and reading out or erasing the stored information from the optical memory. Also, the present invention relates to an optical information reproducing method and an optical information apparatus for optically reading information from the storage medium with the optical head apparatus.

2. Description of the Related Art

An optical memory technique has been put to practical use to manufacture an optical disk in which a pit pattern indicating information is formed. The optical disk is utilized as a high density and large capacity of storage medium. For example, the optical disk is utilized for a digital audio disk, a video disk, a document file disk, and a data file disk. To store information in the optical disk and to read the information from the the optical disk, a light beam radiated from a light source is minutely narrowed in diameter by an optical system, and the light beam minutely narrowed is radiated to the optical disk through the optical system. Therefore, the light beam is required to be reliably controlled by the optical system with high accuracy.

A major part of the optical system is occupied by an optical head apparatus, and a fundamental function of the optical head apparatus is classified into converging performance for minutely narrowing a light beam to form a small diffraction-limited spot of the light beam radiated on an optical disk, focus control in a focus servo system, tracking control in a tracking serve system, and detection of pit signals obtained by radiating the light beam on the pit pattern of the optical disk. The fundamental function of the optical head apparatus is determined by the combination of optical sub-systems and a photoelectric transfer detecting process according to a purpose and a use.

Specifically, an optical pick up head apparatus in which a holographic optical element (or hologram) is utilized to minimize and thin the optical pick up apparatus has been recently proposed.

Previously Proposed Art

FIG. 1 is a constitutional view of a conventional optical head apparatus proposed in Japanese Patent Application No. 46630 of 1991.

As shown in FIG. 1, a conventional optical head apparatus 11 is provided with a light beam source 12 such as a semiconductor laser, a reflection type of blazed hologram 13 for diffracting and reflecting a light beam radiated from the light beam source 12, an information medium 14 such as an optical disk for storing information indicated by patterned pits, an objective lens 15 for converging the light beam diffracted and reflected at the information medium 14 to read the information, and a photo detector 16 for detecting the intensity of the light beam reflected on the information medium 14.

In the above configuration, a light beam 17 (or a laser beam) radiated from the light beam source 12 is radiated to the hologram 13, and zero-order diffraction light 18 is mainly reflected to an outgoing optical path. Thereafter, the zero-order diffraction light 18 passes through the object lens 15 and is converged at the information medium 14. In the information medium 14, the information stored is read by the zero-order diffraction light 18. Thereafter, the zero-order diffraction light 18 is fed back to an incoming optical path which is the same as the outgoing optical path of the light 18. Therefore, the zero-order diffraction light 18 is radiated to the hologram 13 after passing through the objective lens 15. Thereafter, first-order diffraction light 19 is mainly diffracted and reflected in the hologram 13, and is radiated to the photo detector 16.

In the photo detector 16, the intensity distribution of the first-order diffraction light 19 is detected. Therefore, a servo signal for adjusting the position of the objective lens 15 is obtained. Also, the intensity of the first-order diffraction light 19 is detected in the photo detector 16. Because the information medium 14 is rotated with high speed, the patterned pits radiated by the light 17 are changed so that the intensity of the first-order diffraction light 19 detected is changed. Therefore, an information signal indicating the information stored in the information medium 14 is obtained by detecting the change in intensity of the first-order diffraction light 19.

In the above operation, unnecessary diffraction light such as first-order diffraction light and minus first-order diffraction light necessarily occurs in the hologram 13 when the light beam 17 is radiated to the hologram 13 in the outgoing optical path. The unnecessary diffraction light of the outgoing optical path also reads the information stored in the information medium 14, and the unnecessary light is radiated to the photo detector 16. To prevent the occurrence of the unnecessary light, the hologram 13 is manufactured to form a blazed hologram pattern on the surface thereof, so that the intensity of the unnecessary light radiated to the photo detector 16 is decreased.

Next, a method for manufacturing the blazed hologram 13, in which a blazed hologram pattern is formed, is described with reference to FIGS. 2A to 2F.

As shown in FIG. 2A, a hologram substrate 21 is coated with a resist 22, and the resist 22 is covered with a first patterned photomask 28. Thereafter, the resist 22 is exposed to ultraviolet radiation to transfer a first pattern to the resist 22. After the photomask 23 is taken off, the resist 22 exposed is developed as shown in FIG. 2B. After development, the hologram substrate 21 exposed is etched with an etchant at a depth H1 in a first etching process, and the resist 22 is stripped as shown in FIG. 2C.

Thereafter, the hologram substrate 21 etched is again coated with a resist 24, and the resist 24 is covered with a second patterned photomask 25 as shown in FIG. 2D. Thereafter, the resist 24 is exposed to ultraviolet radiation to transfer a second pattern to the resist 24. After the photomask 25 is taken off, the resist 24 exposed is developed as shown in FIG. 2E. After development, the hologram substrate 21 exposed is again etched with an etchant at a depth H2 in a second etching process, and the resist 24 is stripped as shown in FIG. 2F.

Accordingly, as shown in FIG. 3, the brazed hologram 13 of which the surface is formed in echelon shape can be manufactured by etching the hologram substrate 21 twice, so that degree of freedom for controlling the diffraction efficiency in the brazed hologram 13 can be enhanced. In detail, a first phase-modulation degree $\phi_1$ of the light beam 17 determined by the depth H1 and a second phase-modulation degree $\phi_2$ of the light beam 17 determined by the depth H2 are controlled independently, so that the diffraction efficiency for the unnecessary diffraction light can be lowered. In contrast, an intensity ratio of the first-order diffraction light 19 to the light beam 17 can be enhanced.

In addition, because the brazed hologram 13 functions as a mirror for bending the outgoing and incoming optical paths, a thin type of optical head apparatus can be manufactured with a small number of parts.

Next, adverse influence of the unnecessary diffraction light occurring in the outgoing optical path on the information signal obtained in the photo detector 16 is described.

For example, minus first-order diffraction light occurring in the hologram 13 in the outgoing optical path is reflected by the information medium 14, and the minus first-order diffraction light reflected is radiated to the hologram 13. In the hologram 13, zero-order diffraction light of the incoming optical path occurs. Thereafter, the zero-order diffraction light is radiated to the photo detector 16. As shown in FIG. 4, in general, N-order (N=−1, 0, 1, 2, - - - ) diffraction lights 41 of the outgoing optical path occurring in the hologram 13 are reflected by the information medium 14, and the N-order diffraction lights 41 reflected are radiated to the hologram 13. Thereafter, (N+1)-order diffraction lights 42 of the incoming optical path occur, and the (N+1)-order diffraction lights 42 are radiated to the photo detector 16.

In this case, first-order diffraction light (N=0) radiated to the photo detector 16 is the largest in intensity among the (N+1)-order diffraction lights. Therefore, first-order diffraction light L1 of the incoming optical path occurring in the hologram 13 is utilized as necessary light in the conventional optical head apparatus 11. The second largest light in intensity is zero-order diffraction light L2 (N=−1) of the incoming optical path occurring by diffracting minus first-order diffraction light of the outgoing optical path in the hologram 13 and second-order diffraction light L3 (N=1) of the incoming optical path occurring by diffracting zero-order diffraction light of the outgoing optical path in the hologram 13.

Therefore, in cases where the conventional optical head apparatus 11 is designed so as to sufficiently decrease the ratio in intensity of both the zero-order diffraction light L2 and the second-order diffraction light L3 to the first-order diffraction light L1, the adverse influence of the unnecessary light including the diffraction lights L2, L3 on the information signal can be minimized. That is, noise included in the information signal can be reduced.

In addition to the intensity reduction of the lights L2, L3, because aberration in the N-order diffraction lights becomes larger as the number N is higher, converging spots of the N-order diffraction lights on the information medium 14 become larger in size as the number N is higher. Therefore, the intensity of higher order diffraction light such as third-order diffraction light radiated to the information medium 14 rotated does not vary so much, so that the information stored in the information medium 14 is not read by the higher order diffraction light. As a result, even though the higher order diffraction light is radiated to the photo detector 16, any noise is not generated in the information signal so much.

Accordingly, it is enough to reduce the intensities of the diffraction lights L2, L3 to minimize the noise included in the information signal.

The relationship between the second phase-modulation degree $\phi_2$ of the light beam 17 determined by the depth H2 and a ratio $E_2$ in intensity of the unnecessary light L2, L3 to the first-order diffraction light L1 is graphically shown in FIG. 5.

As shown in FIG. 5, in cases where the second phase-modulation degree $\phi_2$ of the light beam 17 ranges from $0.2\pi$ to $0.45\pi$, the ratio $E_2$ is less than 0.3.

Problems to be Solved by the Invention

However, the ratio $E_2$ is over 0.2 so that a small quantity of zero-order diffraction light L2 and a small quantity of second-order diffraction light L3 are inevitably radiated to the photo detector 16. Therefore, not only a required piece of information stored in the information medium 14 is mainly transferred to the photo detector 16 as the information signal by the first-order diffraction light L1, but also an unnecessary piece of information is secondarily transferred to the photo detector 16 as the noise in small quantity by the zero-order diffraction light L2 and the second-order diffraction light L3.

Accordingly, even though the blazed hologram 13 is manufactured to reduce the intensities of the unnecessary lights L2, L3 as shown in FIGS. 2, 3, the noise are inevitably generated in the photo detector 16.

SUMMARY OF THE INVENTION

A first object of the present invention is to provide, with due consideration to the drawbacks of such a conventional optical head apparatus, an optical head apparatus in which any noise adversely influences an information signal is not substantially generated. Also, the first object is to provide an optical head apparatus which is lightweight and is cheaply manufactured in a small size.

Also, a second object of the present invention is to provide an optical information reproducing method for optically reading information from an information medium with the optical head apparatus.

In addition, a third object of the present invention is to provide an optical information apparatus for optically reading information from an information medium with the optical head apparatus.

The first object is achieved by the provision of an optical head apparatus for reading pieces of original information from an information medium in which a series of patterned track pits indicating the original information is formed, comprising:
 a light beam source for radiating a light beam;
 a hologram having a hologram pattern for mainly changing the light beam radiated from the light beam source to zero-order diffraction light and secondarily diffracting the light beam radiated from the light beam source to produce unnecessary light, the hologram functioning as a lens to converge the unnecessary light and functioning as a flat plate for the zero-order diffraction light;
 an optical converging instrument for optically converging the zero-order diffraction light mainly occurring in the hologram at a patterned track pit of the information medium in a focus condition and optically converging the unnecessary light diffracted and converged in the hologram at a plurality of undesired patterned track pits of the information medium in a defocus condition, the zero-order diffraction light converged at the patterned track pit of the information medium being diffracted in the hologram and being changed to first-order diffraction light; and the unnecessary light converged at the undesired patterned track pits of the information medium being diffracted in the hologram; and a photo detecting instrument for detecting main intensity of the first-order diffraction light diffracted in the hologram and detecting secondary intensity of the unnecessary light diffracted in the hologram, the original information stored in the information medium being reproduced with the main intensity of the first-order diffraction light, and the secondary intensity of the unnecessary light being changed to a piece of averaged information functioning as noise which does not adversely influence the original information reproduced with the main intensity of the first-order diffraction light.

In the above configuration, light beam radiated from the light beam source is mainly changed to necessary light such as zero-order diffraction light in the blazed hologram. Also, the light beam radiated from the light beam source is secondarily diffracted to produce unnecessary light in the blazed hologram.

The zero-order diffraction light is not converged by the blazed hologram because the blazed hologram having the blazed pattern merely functions as a transparent plate for the zero-order diffraction light. Therefore, when the optical converging instrument such as an objective lens is focused on the information medium, the zero-order diffraction light is converged at the information medium by the optical converging instrument to form a small converging spot on a patterned pit, so that a piece of original information indicated by the patterned pit is read by the zero-order diffraction light. Thereafter, the zero-order diffraction light is reflected to the blazed hologram and is diffracted to produce first-order diffraction light. The first-order diffraction light is converged at the photo detecting instrument because the blazed hologram functions as a lens. In the photo detecting instrument, the slain intensity of the first-order diffraction light is detected, and the original information indicated by the patterned pit is reproduced.

In contrast, the unnecessary light is converged by the blazed pattern of the blazed hologram. Therefore, the unnecessary light is converged at the information medium in a defocus condition by the optical converging instrument to form a comparatively large converging spot on a plurality of undesired patterned pits, so that pieces of original information indicated by the undesired patterned pits are read by the unnecessary light. Thereafter, the unnecessary light is reflected to the blazed hologram and is diffracted. Thereafter, the unnecessary light is converged at the photo detecting instrument. In the photo detecting instrument, the secondary intensity of the unnecessary light is detected, and a piece of averaged information obtained by averaging pieces of original information indicated by the undesired patterned pits is reproduced. Because the time-variation of the average information is almost zero, the averaged information functions as noise which does not adversely influence the original information reproduced by the main intensity of the first-order diffraction light.

Accordingly, because the blazed hologram functions as a lens for the unnecessary light and because the blazed pattern of the blazed hologram does not function as a lens for the necessary light such as zero-order diffraction light, the time-variation of noise included in an information signal becomes almost zero. In other words, adverse influence of the noise on the information signal can be considerably reduced.

It is preferred that the blazed hologram in the apparatus additionally include a first tracking error detective diffraction region for diffracting the zero-order diffraction light converged at one side of the patterned pit of the information medium to produce a first beam of the first-order diffraction light, and a second tracking error detective diffraction region for diffracting the zero-order diffraction light converged at another side of the patterned pit of the information medium to produce a second beam of the first-order diffraction light; and the photo detecting instrument in the apparatus additionally include a first tracking error photo detector for detecting intensity of the first beam of the first-order diffraction light diffracted in the first tracking error detective diffraction region, and a second tracking error photo detector for detecting intensity of the second beam of the first-order diffraction light diffracted in the second tracking error detective diffraction region, a tracking servo signal being produced according to a mutual relation between the intensity of the first beam of the first-order diffraction light detected in the first tracking error photo detector and the intensity of the second beam off the first-order diffraction light detected in the second tracking error photo detector, and the position of the optical converging instrument being adjusted in a radial direction of the optical converging instrument with the tracking servo signal.

In the above configuration, the zero-order diffraction light converged at one side of the patterned pit of the information medium is reflected to the first tracking error detective diffraction region of the blazed hologram, and a first beam of the first-order diffraction light is produced. In the same manner, the zero-order diffraction light converged at another side of the patterned pit of the information medium is reflected to the second tracking error detective diffraction region of the blazed hologram, and a second beam of the first-order diffraction light is produced. Therefore, in cases where the center of the converging spot of the zero-order diffraction light is positioned in the middle of the patterned pit, the fist beam and the second beam are diffracted by the patterned pit in the same manner.

Thereafter, first intensity of the first beam of the first-order diffraction light is detected in the first tracking error photo detector, and second intensity of the second beam of the first-order diffraction light is detected in the second tracking error photo detector. Therefore, a tracking servo signal can be defined as the difference between the first intensity and the second intensity. Thereafter, the position off the optical converging instrument is adjusted in a radial direction off the optical converging instrument so as to reduce the value off the tracking servo signal. As a result, the center of the converging spot of the zero-order diffraction light is positioned in the middle of the patterned pit.

Also, it is preferred that the blazed hologram of the apparatus comprise a central diffraction region to which the zero-order diffraction light radiated to original information stored in the information medium with low density is biasedly radiated, and a periphery diffraction region to which the zero-order diffraction light radiated to original information stored in the information medium with high density is biasedly radiated, the unnecessary light reflected by the information medium intending to be diffracted in the central diffraction region of the blazed hologram; and the photo detecting instrument of the apparatus comprise a low density information detector for detecting first main intensity of the first-order diffraction light diffracted in the central diffraction region of the blazed hologram, and a high density information detector for detecting second main intensity of the first-order diffraction light diffracted in the peripheral diffraction region of the blazed hologram.

In the above configuration, when original information stored in the information medium with high density is read by the beam of the zero-order diffraction light, the original information tends to shift to the periphery of the beam of the zero-order diffraction light. Therefore, the zero-order diffraction light transferring the original information is biasedly diffracted in the periphery diffraction region. In contrast, because the unnecessary light is radiated to the information medium in a defocus condition, pieces of original information read by the unnecessary light is equivalent to a piece of averaged information stored with low density. Therefore, the unnecessary light is biasedly diffracted in the central diffraction region.

Thereafter, the intensity of the first-order diffraction light transferring the original information stored in the information medium with high density is detected in the high density information detector, and the intensity of the first-order diffraction light transferring the original information stored in the information medium with low density is detected in the low density information detector. Also, the intensity of the unnecessary light is detected in the low density information detector.

Accordingly, an information signal in which noise caused by the unnecessary light is reduced can be obtained by processing the intensity detected in the high density information detector.

Also, the first object is achieved by the provision of an optical head apparatus for reading pieces of original information from an information medium in which a series of patterned track pits indicating the original information is formed, comprising:

a light beam source for radiating a light beam;
a hologram partitioned into a plurality of diffraction regions for mainly changing the light beam radiated from the light beam source to a beam of zero-order diffraction light and secondarily diffracting the light beam radiated from the light beam source in each of the diffraction regions to produce a plurality of beams of unnecessary light, a numerical aperture of each of the diffraction regions being smaller than that of the hologram, and the beams of unnecessary light diffracted in the diffraction regions being respectively widened;
an optical converging instrument for optically converging the zero-order diffraction light mainly occurring in the hologram at a patterned track pit of the information medium in a focus condition and optically converging each of the beams of the unnecessary light widened in the diffraction regions of the hologram at a plurality of undesired patterned track pits of the information medium, the zero-order diffraction light converged at the patterned track pit of the information medium being diffracted in the hologram and being changed to first-order diffraction light, and the beams of the unnecessary light respectively converged at the undesired patterned track pits of the information medium being diffracted in the hologram; and
a photo detecting instrument for detecting main intensity of the first-order diffraction light diffracted in the hologram and detecting secondary intensities of the beams of the unnecessary light diffracted in the hologram, the original information stored in the information medium being reproduced by the main intensity of the first-order diffraction light, and the secondary intensities of the beams of the unnecessary light being changed to a piece of averaged information functioning as noise which does not adversely influence the original information reproduced by the main intensity of the first-order diffraction light.

In the above configuration, light beam radiated from the light beam source is mainly changed to necessary light such as zero-order diffraction light in the blazed hologram. Also, the light beam radiated from the light beam source is secondarily diffracted in the diffraction regions of the blazed hologram to produce beams of unnecessary light.

The zero-order diffraction light is not diffracted by the blazed hologram. Therefore, when the optical converging instrument such as an objective lens is focused on the information medium, the zero-order diffraction light is converged at the information medium by the optical converging instrument to form a small converging spot on a patterned pit, so that a piece of original information indicated by the patterned pit is read by the zero-order diffraction light. Thereafter, the zero-order diffraction light is reflected to the blazed hologram and is diffracted in each of the diffraction regions to produce beams of first-order diffraction light. The first-order diffraction light is radiated the photo detecting instrument. In the photo detecting instrument, the main intensity of the first-order diffraction light is detected, and the original information indicated by the patterned pit is reproduced.

In contrast, the unnecessary light is largely widened in each of the diffraction regions of the blazed hologram because a numerical aperture of each of the diffraction regions is small than that of the blazed hologram. Therefore, the beams of the unnecessary light are converged at the information medium by the optical converging instrument in a defocus condition to respectively form a comparatively large converging spot on a plurality of undesired patterned pits, so that pieces of original information indicated by the undesired patterned pits are read by each of the beams of the unnecessary light. Thereafter, the beams of the unnecessary light are reflected to the blazed hologram and are diffracted. Thereafter, the beams of the unnecessary light are converged at the photo detecting instrument. In the photo detecting instrument, the secondary intensities of the beams of the unnecessary light are detected, and a piece of averaged information obtained by averaging pieces of original information indicated by the patterned pits is reproduced. Because the time-variation of the average information is almost zero, the averaged information functions as noise which does not adversely influence the original information reproduced by the main intensity of the first-order diffraction light.

Accordingly, because the blazed hologram is partitioned into the diffraction regions to reduce a numerical aperture of the blazed hologram to another numerical aperture of each of the diffraction regions, the unnecessary light can be selectively converged at the information medium in a defocus condition. Therefore, the time-variation of noise included in an information signal becomes almost zero. In other words, adverse influence of the noise on the information signal can be considerably reduced.

The second object is achieved by the provision of a method for reproducing original information indicated by patterned pits which are stored in an information medium, comprising the steps of:
- forming a hologram pattern of a blazed hologram to function as a lens for light diffracted in the blazed hologram;
- radiating a light beam to the blazed hologram to mainly change the light beam to zero-order diffraction light and to secondarily change the light beam to unnecessary light produced by diffracting the light beam;
- optically converging the zero-order diffraction light at a patterned pit of the information medium in a focus condition to read a piece of original information indicated by the patterned pit, the zero-order diffraction light being reflected by the information medium;
- optically converging the unnecessary light at a plurality of undesired patterned pits of the information medium in a defocus condition to undesirably read pieces of unnecessary original information, the unnecessary light being reflected by the information medium;
- diffracting the zero-order diffraction light reflected by the information medium in the blazed hologram to produce first-order diffraction light;
- diffracting the unnecessary light reflected by the information medium in the blazed hologram;
- detecting main intensity of the first-order diffraction light to reproduce the original information indicated by the patterned pit; and
- detecting secondary intensity of the unnecessary light diffracted in the blazed hologram to reproduce a piece of averaged information from the unnecessary original information indicated by the undesired patterned pits, the averaged information functioning as noise which does not adversely influence the original information reproduced.

In the above steps, because the blazed hologram functions as a lens for the unnecessary light, the unnecessary light is converged at the information medium in a defocus condition even though the zero-order diffraction light is converged in a focus condition. Therefore, pieces of unnecessary original information are necessarily read by the unnecessary light. Therefore, because the unnecessary original information are averaged to reproduce a piece of averaged information when the secondary intensity of the unnecessary light is detected, the averaged information functions as noise which does not adversely influence the original information reproduced.

Accordingly, the noise caused by the unnecessary light is substantially reduced.

Also, the second object is achieved by the provision of a method for reproducing original information indicated by patterned pits which are stored in an information medium, comprising the steps of:
- dividing a blazed hologram into a plurality of diffraction regions to set a numerical aperture of each of the diffraction regions to a value smaller than that of the blazed hologram;
- radiating a light beam to the blazed hologram to mainly change the light beam to a beam of zero-order diffraction light and to secondarily change the light beam to a plurality of beams of unnecessary light produced by diffracting the light beam in the diffraction regions, the beams of unnecessary light being respectively widened;
- optically converging the zero-order diffraction light at a patterned pit of the information medium in a focus condition to read a piece of original information indicated by the patterned pit, the zero-order diffraction light being reflected by the information medium;
- optically converging each beam of the unnecessary light at a plurality of undesired patterned pits of the information medium in a defocus condition to undesirably read pieces of unnecessary original information, the beams of the unnecessary light being reflected by the information medium;
- diffracting the zero-order diffraction light reflected by the information medium in the blazed hologram to produce first-order diffraction light;
- diffracting the beams of the unnecessary light reflected by the information medium in the blazed hologram;
- detecting main intensity of the first-order diffraction light to reproduce the original information indicated by the patterned pit; and
- detecting secondary intensities of the beams of the unnecessary light diffracted in the blazed hologram to reproduce a piece of averaged information from the unnecessary original information indicated by the undesired patterned pits in each beam of the unnecessary light, the averaged information functioning as noise which does not adversely influence the original information reproduced.

In the above steps, because the blazed hologram is partitioned into a plurality of diffraction regions, a numerical aperture of each of the diffraction regions becomes smaller than that of the blazed hologram. Therefore, each beam of the unnecessary light is greatly widened in diameter and is converged at the information medium. Therefore, pieces of unnecessary original information are necessarily read by each beam of the unnecessary light. As a result, because the unnecessary original information are averaged to reproduce a piece of averaged information when the secondary intensities of the beams of the unnecessary light are detected, the averaged information functions as noise which does not adversely influence the original information reproduced.

Accordingly, the noise caused by the unnecessary light is substantially reduced.

The third object is achieved by the provision of an optical information apparatus for optically reading original information with the optical head apparatus in which the focus servo signal is produced in the multi-division photo detector, comprising:
- an information medium driving mechanism for rotating the information medium;

an external electric source for supplying driving power to the information medium driving mechanism;

an optical head driving apparatus for roughly positioning the optical converging instrument of the optical head apparatus on a desired track pit of the information medium; and a control circuit for generating a control signal according to the focus servo signal produced in the multi-division photo detector and precisely positioning the optical converging instrument of the optical head apparatus on the desired track pit of the information medium under the control of the control signal.

In the above configuration, the information medium is rotated by the information medium driving mechanism so that the original information reproduced varies to form an information signal. Also, the optical converging instrument of the optical head apparatus is precisely positioned on the desired track pit of the information medium under the control of the control signal. Accordingly, the original information can be stably reproduced with high accuracy.

BRIEF DESCRIPTION OF THE DRAWINGS

The objects, features and advantages of the present invention will be apparent from the following description taken in conjunction with the accompanying drawings, in which:

FIG. 8D is a constitutional view of the optical head apparatus shown in FIG. 6, showing the action of unnecessary light occurring in a blazed hologram;

DETAIL DESCRIPTION OF THE PREFERRED EMBODIMENTS

Preferred embodiments of an optical head apparatus according to the present invention are initially described with reference to drawings.

Figure 6:
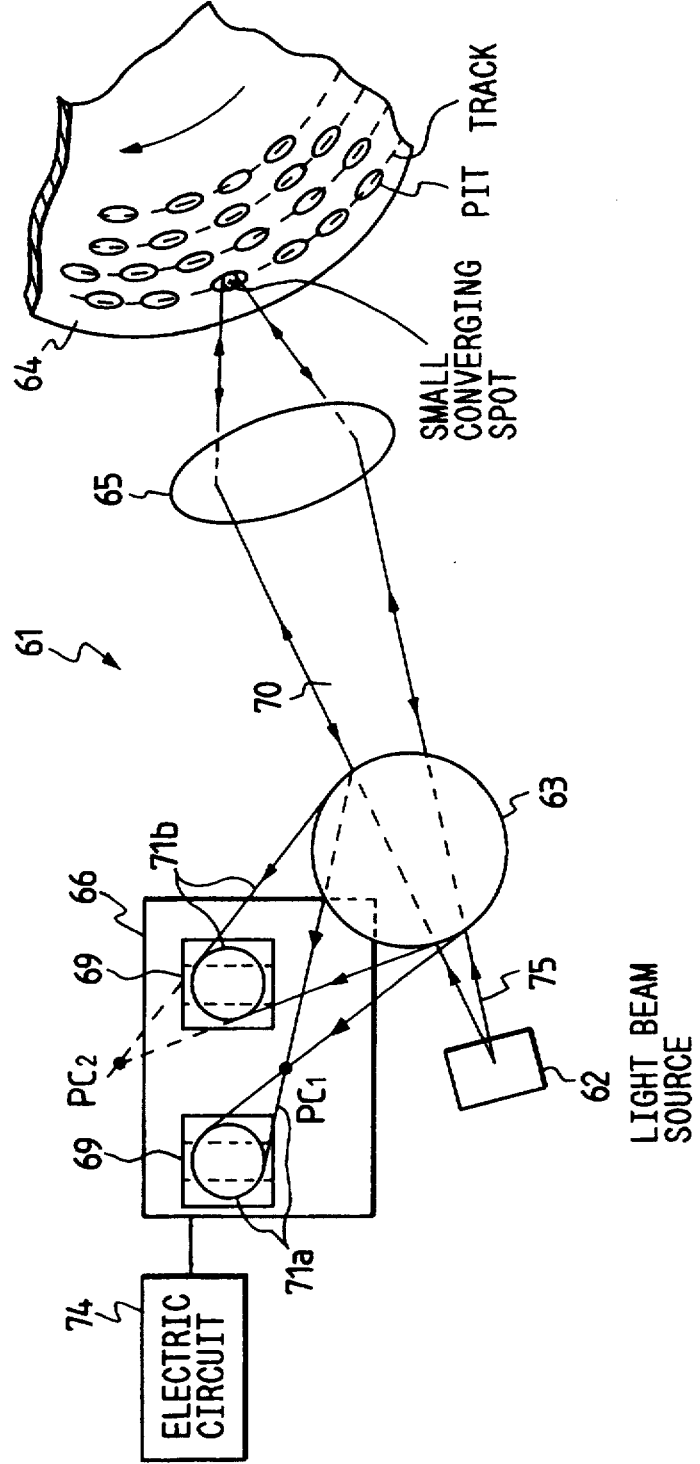
FIG. 6 is a constitutional view of an optical head apparatus according to a first embodiment of the present invention.

FIG. 6 is a constitutional view of an optical head apparatus according to a first embodiment of the present invention.

As shown in FIG. 6, an optical head apparatus 61 for reading information indicated by patterned pits from an information medium 64 such as an optical disk, comprises a light beam source 62 such as a semiconductor laser, a transmission type of blazed hologram 63 for transmitting a light beam radiated from the light beam source 62 in an outgoing optical path to produce zero-order diffraction light and diffracting the zero-order diffraction light reflected in the information medium in an incoming optical path to produce first-order diffraction light, an objective lens 65 for converging the zero-order diffraction light at the information medium 64 to read the information stored in the information medium 64, and a photo detecting apparatus 66 for detecting the intensity of the first-order diffraction light diffracted by the blazed hologram 63.

The depth of focus in the objective lens 65 is about $\pm 2$ $\mu$m.

Figure 7:
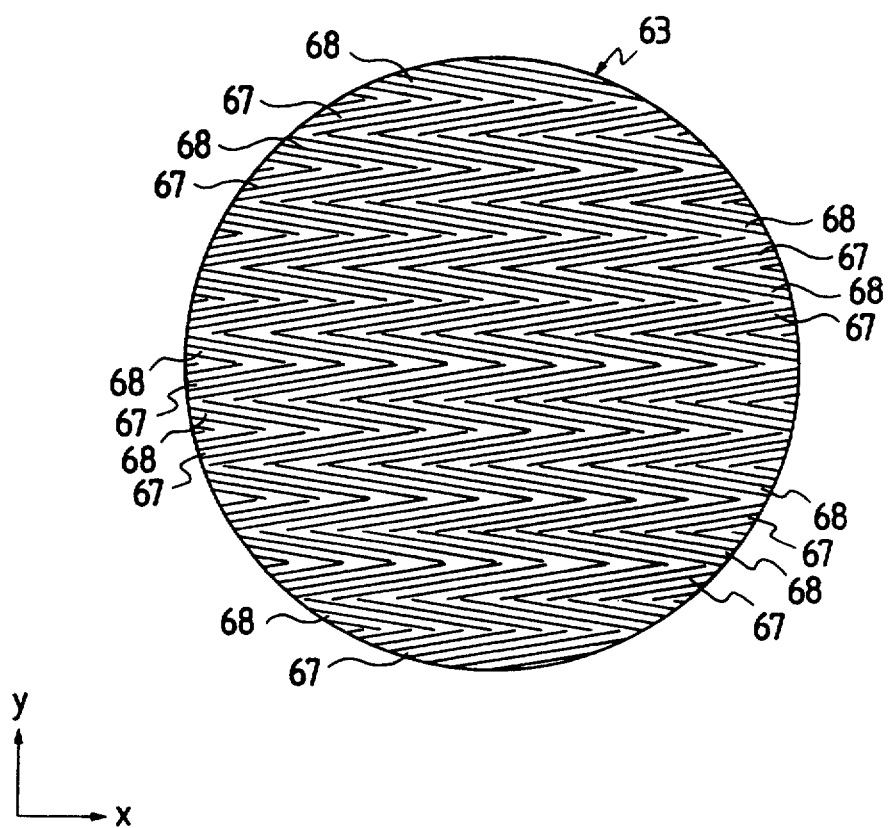
FIG. 7 is a plan view of a blazed hologram utilized in the optical head apparatus shown in FIG. 6, showing a hologram pattern of the blazed hologram.

The blazed hologram 63 consists of a plurality of first focus error detective diffraction regions 67 and a plurality of second focus error detective diffraction region 68 alternately arranged, as shown in FIG. 7. Each of the diffraction regions 67, 68 is blazed in the same manner as the hologram 13 shown in FIG. 3. The first focus error detective diffraction regions 67 are blazed in a first direction, and the second focus error detective diffraction regions 68 are blazed in a second direction. In cases where first-order diffraction light occurs in each of the first focus error detective diffraction regions 67 of the hologram 63, the first-order diffraction light is converged according to a first focal length $f_1$ of the first diffraction regions 67. Also, in cases where first-order diffraction light occurs in each of the second focus error detective diffraction regions 68 of the hologram 63, the first-order diffraction light is converged according to a second focal length $f_2$ of the second diffraction regions 68. Therefore, the blazed hologram 63 functions as a lens having two focal lengths for the first-order diffraction light. Also, the blazed hologram 63 functions as a lens for higher order diffraction light. In contrast, even though zero-order diffraction light occurs in the hologram 63, the hologram 63 merely functions as a transparent plate because the light beam 69 reflected by the hologram 63 without being diffracted is changed to the zero-order diffraction light.

The photo detecting apparatus 66 has a six-division photo detector 69 in which six detecting sections S10, S20, S30, S40, S50, and S60 are provided. In cases where first-order diffraction light of an incoming optical path occurs in the first diffraction regions 67 of the hologram 63, beams of the first-order diffraction light are radiated to the first to third detecting sections S10, S20, and S30 of the six-division photo detector 69. Also, in cases where first-order diffraction light of the incoming optical path occurs in the second diffraction regions 68 of the hologram 63, beams of the first-order diffraction light are radiated to the fourth to sixth detecting sections S40, S50, and S60 of the six-division photo detector 69.

In addition, the first-order diffraction light of the incoming optical path occurring in the first diffraction regions 67 of the hologram 63 is transferred to be converged at a first converging point $PC_1$ positioned at a front side of the photo detector 69, and the first-order diffraction light of the incoming optical path occurring in the second diffraction regions 68 of the hologram 63 is transferred to be converged at a second converging point $PC_2$ positioned at a back side of the photo detector 69.

In the above configuration, a light beam 75 (or a laser beam) radiated from the light beam source 62 is radiated to the blazed hologram 63, and a beam of zero-order diffraction light 70 of an outgoing optical path mainly occurs in the blazed hologram 63. Thereafter, the zero-order diffraction light 70 passes through the blazed hologram 63 and the object lens 65 and is radiated to the information medium 64. In this case, because the blazed hologram 63 functions as a transparent plate for the zero-order diffraction light 70, the zero-order diffraction light 70 is converged at the information medium 64 in dependence on the position of the objective lens 65 to make a small converging spot on the information medium 64.

Figure 8A:
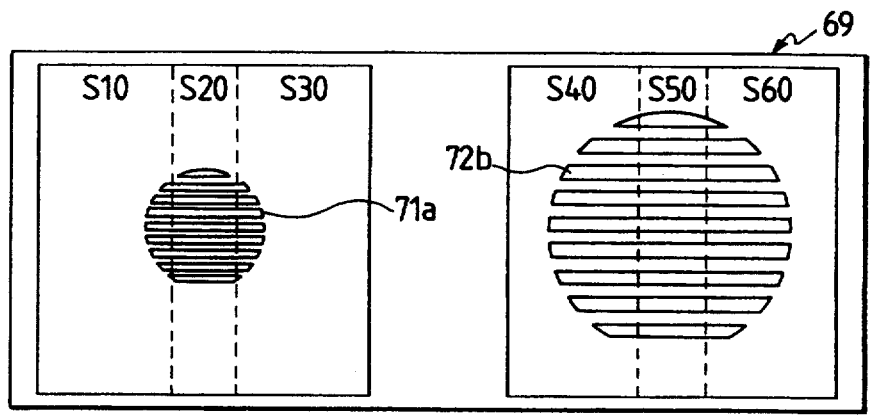
FIGS. 8A and 8C respectively show two images of beams of first-order diffraction light radiated to a six-division photo detector utilized in the optical head apparatus shown in FIG. 6 on condition that an objective lens is defocused on an information medium.
Figure 8B:
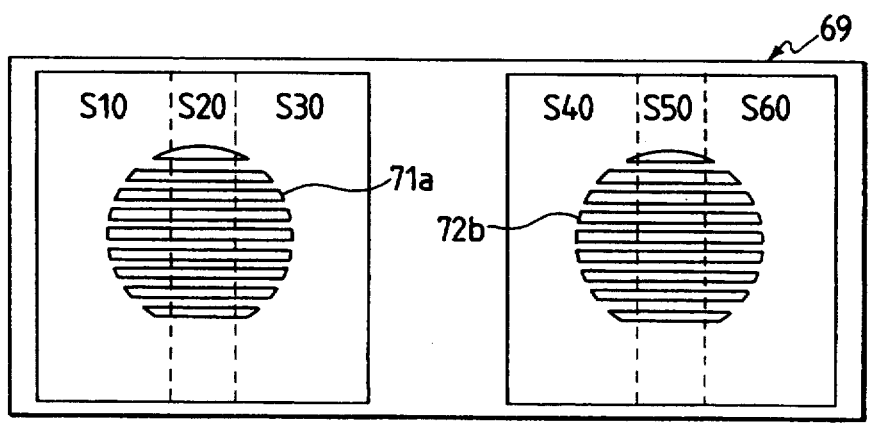
FIG. 8B shows two images of beams of first-order diffraction light radiated to a six-division photo detector utilized in the optical head apparatus shown in FIG. 6 on condition that an objective lens is just focused on an information medium.
Figure 8C:
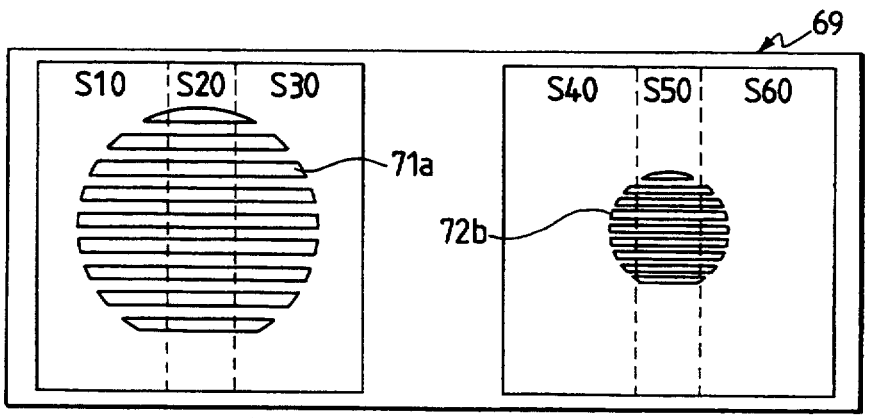

In the information medium 64, the information stored is read by the zero-order diffraction light 70. Thereafter, the zero-order diffraction light 70 is fed back to an incoming optical path which is the same as the outgoing optical path. Therefore, the zero-order diffraction light 70 is radiated to the hologram 63 after passing through the objective lens 65. Thereafter, the zero-order diffraction light 70 radiated to the first diffraction regions 67 of the hologram 63 is diffracted in the hologram 63, and beams 71a of first-order diffraction light 71 mainly occur. Each beam 71a occurs in a first diffraction region 67. The beams 71a of the first-order diffraction light 71 are radiated to the first to third detecting sections S10, S20, and S30 of the six-division photo detector 69. That is, an inverted image of the first diffraction regions 67 is displayed on the photo detector 69 as shown in FIGS. 8A, 8B, and 8C. Also, the zero-order diffraction light 70 radiated to the second diffraction regions 68 of the hologram 63 is diffracted in the hologram 63, and beams 71b of the first-order diffraction light 71 mainly occur. Each beam 71b occurs in a second diffraction region 68. The beams 71b of the first-order diffraction light 71 is radiated to the fourth to sixth detecting sections S40, S50, and S60 of the six-division photo detector 69. That is, an erecting image of the second diffraction regions 68 is displayed on the photo detector 69 as shown in FIGS. 8A, 8B, and 8C.

In cases where the zero-order diffraction light 70 is converged at the information medium 64 on condition that the objective lens 65 is defocused on the information medium 64, the inverted image of the first diffraction regions 67 shown at the left side of FIG. 8A or 8C is radiated to the photo detector 69, and the erecting image of the second diffraction regions 68 shown at the right side of FIG. 8A or 8C is radiated to the photo detector 69. In contrast, in cases where the zero-order diffraction light 70 is converged at the information medium 64 on condition that the objective lens 65 is just focused on the information medium 64, the inverted image of the first diffraction regions 67 shown at the left side of FIG. 8B is radiated to the photo detector 69, and the erecting image of the second diffraction regions 68 shown at the right side of FIG. 8B is radiated to the photo detector 69.

In the photo detector 69, a focus servo signal for adjusting the position of the objective lens 65 and an information signal indicating the information stored in the information medium 64 are obtained by detecting the distribution and intensity of the first-order diffraction light 71. In this embodiment, a spot size detection method is utilized to detect the focus servo signal. The method is proposed in Japanese Patent Application No. 185722 of 1990. In short, in cases where the method is adopted, an allowable error in the assembly of the optical head apparatus 61 can be remarkably enlarged, and the focus servo signal can be stably obtained even though the wavelength of the light beam 75 varies.

According to the spot size detection method, the intensities of the beams 71a of the first-order diffraction light are detected in the first to third detecting sections S10, S20, and S30 of the photo detector 69 and are changed to electric current signals S10, S20, and S30 in an electric circuit 74, regardless of whether the blazed hologram 63 functioning as a lens is focused on the photo detector 69. Also, the intensities of the beams 71b of the first-order diffraction light are detected in the fourth to sixth detecting sections S40, S50, and S60 and are changed to electric current signals S40, S50, and S60 in the electric circuit 74, regardless of whether the blazed hologram 63 functioning as a lens is focused on the photo detector 69. Thereafter, a focus error signal $S_{fe}$ equivalent to the focus servo signal is obtained in the electric circuit 74 according to an equation (1).

$$S_{fe} = (S10 + S30 - S20) - (S40 + S60 - S50) \quad (1)$$

Thereafter, the position of the objective lens 65 is adjusted to the focusing position by moving the objective lens 65 in a direction of the optical path so as to minimize the absolute value of the focus error signal $S_{fe}$. In this case, because the first converging point $PC_1$ of the beams 71a is positioned at the front side of the photo detector 69 and because the second converging point $PC_2$ of the beams 71b is positioned at the back side of the photo detector 69, both terms $S10 + S30 - S20$ and $S40 + S60 - S50$ in the equation (1) are inversely decreased or increased. Therefore, the focus error signal $S_{fe}$ is easily approached zero, and the images of the first and second fields 67, 68 shown in FIG. 8B can be obtained on the photo detector 69.

Accordingly, because the objective lens 65 is adjusted by utilizing the focus error signal $S_{fe}$, the zero-order diffraction light 70 can be reliably converged at the information medium 64 on condition that the objective lens 65 is just focused on the information medium 64. Therefore, information stored in the information medium 64 can be read with high accuracy because a small converging spot of the zero-order diffraction light 70 is formed on a patterned pit of the information medium 64.

Also, even though the beams 71a, 71b of the first-order diffraction light 71 are converged at the photo detector 69 on condition that the blazed hologram 63 functioning as a lens is defocused on the photo detector 69, the intensities of the beams 71a, 71b can be reliably detected in the six detecting sections of the photo detector 69 according to the spot size detection method. Therefore, the intensity distribution of the first-order diffraction light 71 is detected in the photo detector 69, and the focus error signal $S_{fe}$ can be obtained.

An information signal $S_{in}$ is obtained in the electric circuit 74 by adding all of the intensities of the beams 71a, 71b according to an equation (1).

$$S_{in} = S10 + S20 + S30 + S40 + S50 + S60 \quad (2)$$

Because the information medium 64 is rotated with high speed, a patterned pit radiated by the small converging spot of the zero-order diffraction light 70 is rapidly changed, so that the sum of the beams 71a, 71b in intensity is changed. Therefore, the information stored in the information medium 64 can be reproduced by the information signal $S_{in}$.

Accordingly, the information transferred with the first-order diffraction light 71 can be obtained in the photo detector 69 by detecting the total intensities of the beams 71a, 71b of the first-order diffraction light 71 radiated to the six detecting sections of photo detector 69, regardless of whether the blazed hologram 63 is focused on the photo detector 69.

Next, the action of unnecessary light such as N-order diffraction light (N is an integer except zero) of the outgoing optical path and (N+1)-order diffraction light of the incoming optical path is described with reference to FIG. 8D.

The light beam 75 radiated from the light beam source 62 is diffracted in the blazed hologram 63, and unnecessary light 72 of the outgoing optical path occurs in some degree. In this case, the blazed hologram 63 functions as a lens for the unnecessary light 72. In detail, first beams 72a of the unnecessary light 72 diffracted in the first diffraction regions 67 of the blazed hologram 63 are converged at the information medium 64 in dependence on the first focal length $f_1$ of the first diffraction regions 67, and second beams 72b of the unnecessary light 72 diffracted in the second diffraction regions 68 of the blazed hologram 63 are converged at the information medium 64 in dependence on the second focal length $f_2$ of the second diffraction regions 68. Thereafter, the unnecessary light 72 of the outgoing optical path passes though the objective lens 65 and is radiated to the information medium 64.

In this case, because the blazed hologram 63 functions as a lens for the unnecessary light, when the zero-order diffraction light 70 is converged at the information medium 64 on condition that the objective lens 65 is just in focus, the unnecessary light 72 is converged at the information medium 64 on condition that the objective lens 65 is out of focus. Therefore, a first comparatively large converging spot of the first beam 72a of the unnecessary light 72 is formed on one or more undesired patterned pits of the information medium 64, and a second comparatively large converging spot of the second beam 72b of the unnecessary light 72 is formed on one or more undesired patterned pits of the information medium 64. Therefore, many pieces of undesired original information stored in the information medium 64 are simultaneously read by the unnecessary light 72, and the undesired original information are transferred by beams 73a, 73b of unnecessary light 73 of the incoming optical path occurring in the hologram 63. The undesired original information transferred by the unnecessary light 73 are detected in the photo detector 69 as a piece of averaged information. In other words, the intensity of the unnecessary light 73 radiated to the photo detector 69 is always constant even though each of the undesired original information varies according to the rotation of the information medium 64. In contrast, the information signal $S_{in}$ always varies according to the rotation of the information medium 64.

Accordingly, because the blazed hologram 63 functions as a lens for the unnecessary light 72 of the outgoing optical path, the unnecessary light 72 is always radiated to the information medium 64 on condition that the objective lens 65 is defocused on the information medium 64. Therefore, the intensity of the unnecessary light 73 radiated to the photo detector 69 hardly varies even though the undesired original information read by the unnecessary light 72 vary. As a result, an unnecessary signal produced by detecting the unnecessary light 73 in the photo detector 69 hardly function as noise included in the information signal $S_{in}$.

In addition, because the depth of focus in the objective lens 65 is about $\pm 2$ $\mu$m, the first and second focal lengths $f_1$, $f_2$ of the blazed hologram 63 are adjusted so as to set the degree of defocus in the objective lens 65 for the unnecessary light 72 to over 5 $\mu$m. Therefore, the time variation in intensity of the unnecessary light 73 is reduced to less than one-tenth that of the first-order diffraction light 71 in the photo detector 69.

Figure 5:
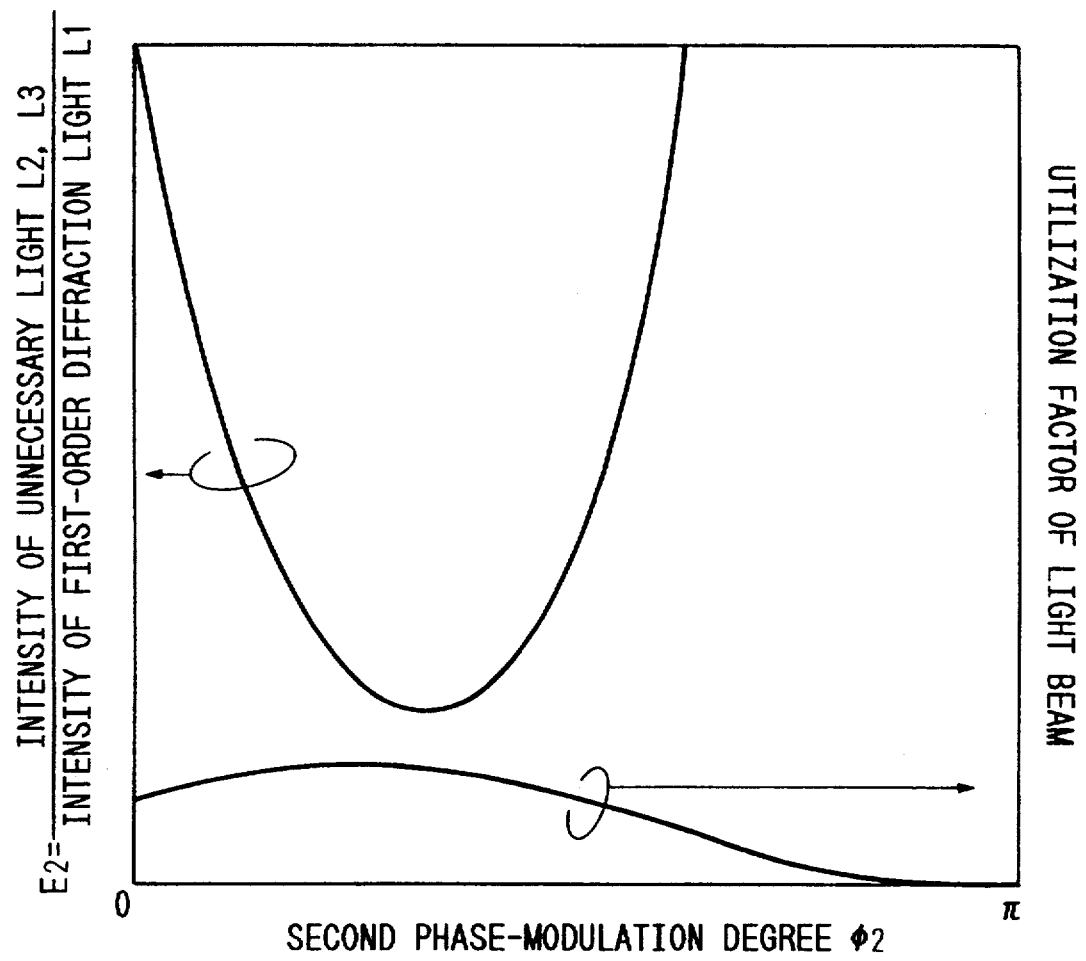
FIG. 5 graphically shows the relationship between a second phase modulation degree $\phi 2$ of a light beam determined by a depth H2 and a ratio $E_2$ in intensity of unnecessary light L2, L3 to first-order diffraction light L1.

Accordingly, in cases where the blazed hologram 63 is manufactured so as to reduce a ratio $E_R$ in intensity of the unnecessary light 73 to the first-order diffraction light 71 to less than 30% as shown in FIG. 5, the amplitude of the noise caused by the unnecessary light 73 becomes less than 3% (30% $\times$ 1/10) of the information signal $S_{in}$ resulting from the first-order diffraction light 71. Therefore, the increase of jitter in the information signal $S_{in}$ can be disregarded.

Next, the reason that the blazed hologram 63 is partitioned into many first diffraction regions 67(m) (m=1,2, i, - - - ,n) and many second diffraction regions 68(m) is described.

When the zero-order diffraction light 70 is reflected by the information medium 64, the light 70 is diffracted by a track pit provided on the information medium 64 to form a diffraction pattern. Therefore, the intensity distribution of the zero-order diffraction light 70 diffracted is changed depending on the relation in position between the converging spot of the light 70 radiated to the information medium 64 and the track pit. For example, in cases where an extending direction of the diffraction regions 67(m), 68(m) (or X-axis direction in FIG. 7) is the same as that of the track pit, the intensity of the zero-order diffraction light 70 radiated to the upper half diffraction regions 67, 68 (positioned in +Y direction) of the blazed hologram 63 is increased. In contrast, the intensity of the zero-order diffraction light 70 radiated to the lower half diffraction regions 67, 68 (positioned in −Y direction) of the blazed hologram 63 is decreased. Therefore, in cases where asymmetry of the first diffraction regions 67 and asymmetry of the second diffraction regions 68 are large in the Y direction, an offset occurs in the focus error signal $S_{fe}$ when the focus error signal $S_{fe}$ is produced according to the spot size detection method. In other words, even though the position of the objective lens 65 is adjusted to the focusing position, the value of the focus error signal $S_{fe}$ does not become zero.

To solve the above drawback, a hologram pattern consisting of many diffraction regions 67(m), 68(m) is formed on the blazed hologram 63 to lessen both the asymmetry of the first diffraction regions 67 and the asymmetry of the second diffraction regions 68 in the Y direction. For example, it is preferred that the blazed hologram 63 be partitioned into from several diffraction regions to several tens of diffraction regions. Therefore, the occurrence of the offset in the focus error signal $S_{fe}$ can be prevented in the first embodiment of the present invention.

Accordingly, a stable focus servo characteristic can be obtained by dividing the blazed hologram 63 into many diffraction fields 67(m), 68(m).

Also, the unnecessary light 72 of the outgoing optical path is divided into many pieces in the diffraction fields 67(m), 68(m) of the blazed hologram 63, and the beams 72a, 72b of the unnecessary light 72 are radiated to the information medium 64. Therefore, many converging spots of the unnecessary light 72 are formed on the information medium 64. In addition, an numerical aperture NA of each of the diffraction fields 67(m), 68(m) respectively functioning as a lens is lessen as compared with that of the blazed hologram 63. Therefore, each of the beams 72a, 72b of the unnecessary light 72 is greatly diffracted and widened. That is, the converging spots of the unnecessary light 72 are enlarged in diameter.

Accordingly, signals obtained by detecting the unnecessary light 73 are moreover averaged, so that noise components in the information signal can be moreover reduced by dividing the blazed hologram 63 into many fields 67(m), 68(m).

Next, the design of the diffraction regions 67(m), 68(m) arranged on the blazed hologram 63 is described.

To separate many converging spots of the unnecessary light 72 formed on the information medium 64 from one another, grating vectors Vg(k) (k=1,2, - - - 2n) of the diffraction regions 67(m), 68(m) in the blazed hologram 63 are set to differ from one another. As is well known, each grating vector Vg(k) is directed in a direction perpendicular to the diffraction region, and the length of the grating vector Vg(k) is defined as $2\pi/PT$ where PT denotes a pitch of blazed patterns. Also, because the converging spot of the zero-order diffraction lights 70 is less than 1 μm in diameter of full width at half maximum, the distance between the converging spots of the beams 72a, 72b of the unnecessary light 72 is set to over 5 μm. Therefore, where a symbol π denotes a ratio of the circumference of a circle to its diameter, a symbol f denotes the focal length of the objective lens 65, and a symbol λ denotes the wavelength of the light beam 75, the length |dVg| of the difference dVg between the grating vectors Vg(k) is set to over $5\ \mu m \times 2\pi/(f*\lambda)$.

Accordingly, because the converging spots of the unnecessary light 72 are separated from one another on the information medium 64, many pieces of information stored in the information medium 64 can be evenly read by the unnecessary light 72 without being partially read. Therefore, signals obtained by detecting the unnecessary light 73 radiated to the photo detector 69 can be moreover averaged, so that noise components in the information signal can be moreover reduced.

Next, a second embodiment is described with reference to FIGS. 9 and 10.

Figure 9:
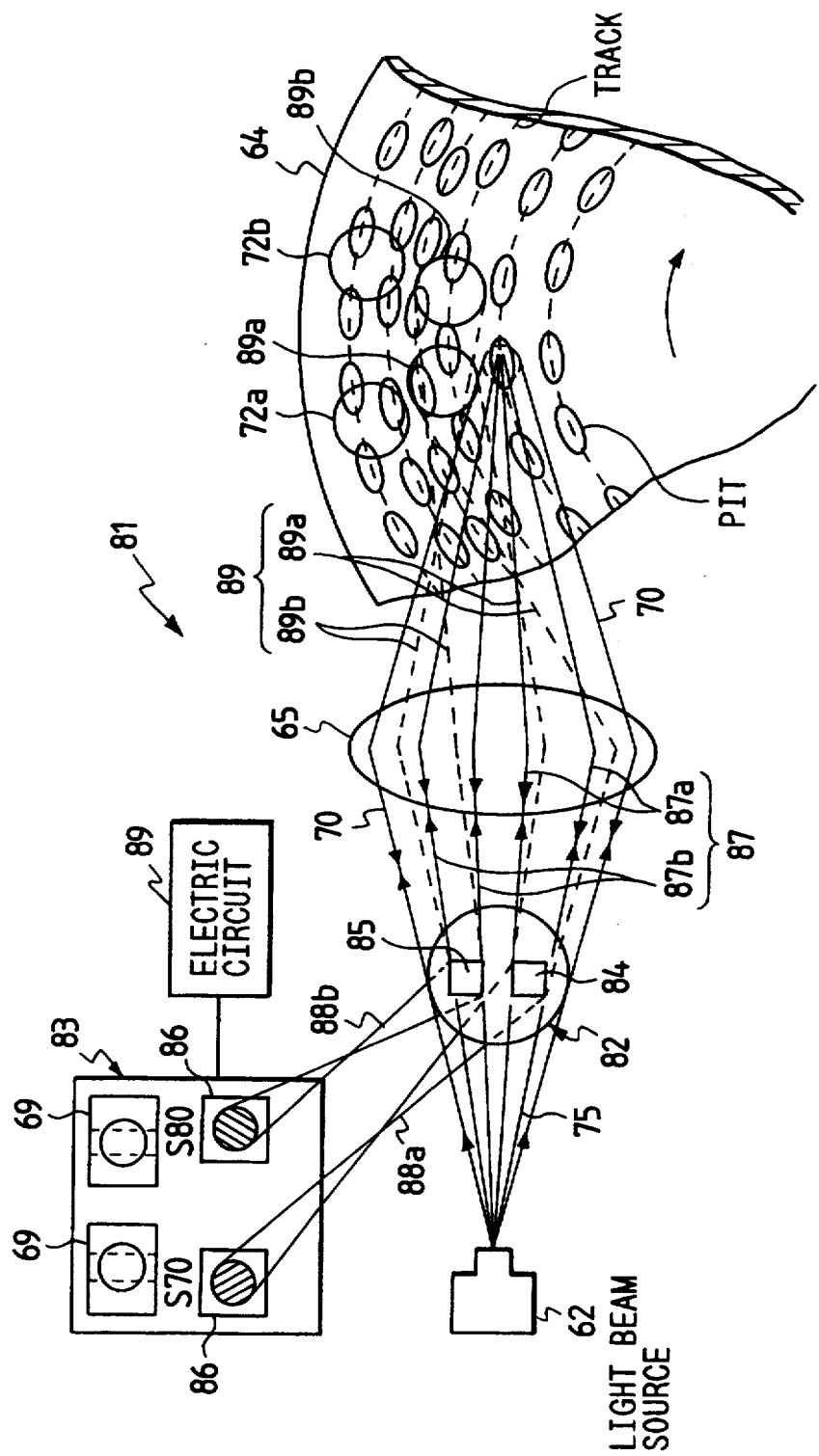
FIG. 9 is a constitutional view of an optical head apparatus according to a second embodiment of the present invention.

FIG. 9 is a constitutional view of an optical head apparatus according to a second embodiment of the present invention.

As shown in FIG. 9, an optical head apparatus 81 for reading information from the information medium 64, comprises the light beam source 62, a transmission type of blazed hologram 82 for transmitting a light beam radiated from the light beam source 62 in an outgoing optical path to produce first-order diffraction light and diffracting the zero-order diffraction light reflected in the information medium 64 in an incoming optical path to produce first-order diffraction light, the objective lens 65, and a photo detecting apparatus 83 for detecting the intensity of the first-order diffraction light diffracted by the blazed hologram 82.

Figure 10:
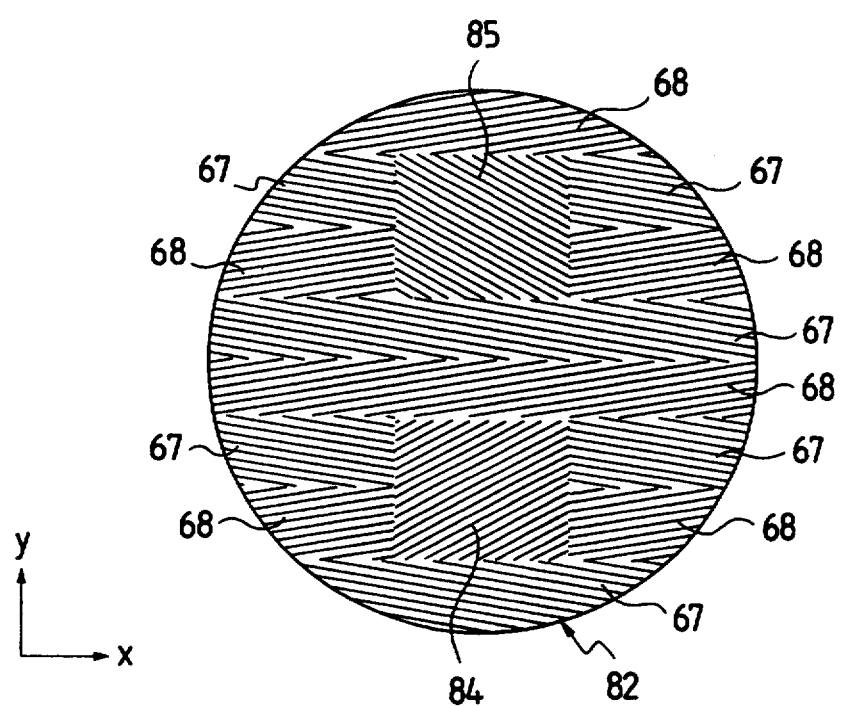
FIG. 10 is a plan view of a blazed hologram utilized in the optical head apparatus shown in FIG. 9, showing a hologram pattern of the blazed hologram.

As shown in FIG. 10, the blazed hologram 82 has the first and second focus error detective diffraction regions 67, 68, a third tracking error detective diffraction region 84, and a fourth tracking error detective diffraction region 85 for changing zero-order diffraction light to a pair of beams of first-order diffraction light utilized to detect a tracking error. The third tracking error detective diffraction region 84 is blazed in a third direction, and the fourth tracking error detective diffraction region 85 is blazed in a fourth direction. In cases where first-order diffraction light occurs in the third diffraction region 84 of the hologram 82, the first-order diffraction light is converged according to a third focal length $f_3$ of the third diffraction region 84. Also, in cases where first-order diffraction light occurs in the fourth diffraction region 85 of the hologram 63, the first-order diffraction light is converged according to the third focal length $f_3$ of the fourth diffraction region 85. Therefore, the diffraction regions 84, 85 respectively function as a lens. In contrast, even though zero-order diffraction light occurs in the diffraction regions 84, 85, each of the diffraction regions 84, 85 merely function as a transparent plate.

The photo detecting apparatus 83 has the six-division photo detector 69 and a tracking error photo detector 86 in which two detecting sections S70 and S80 are provided. In cases where first-order diffraction light of an incoming optical path occurs in the third diffraction region 84 of the hologram 82, the first-order diffraction light is radiated to the detecting section S70 of the photo detector 86. Also, in cases where first-order diffraction light of the incoming optical path occurs in the fourth diffraction region 85 of the hologram 82, the first-order diffraction light is radiated to the detecting section S80 of the photo detector 86.

In the above configuration, information stored in the information medium 64 is read by the zero-order diffraction light 70 occurring in the blazed hologram 82, and the information transferred by the first-order diffraction light 71 occurring in the diffraction fields 67, 68 of the blazed hologram 82 is detected in the photo detector 69 in the same manner as in the first embodiment. Therefore, the objective lens 65 is adjusted to be focused on the information medium 64, and the information signal $S_{in}$ is obtained.

Also, beams 87a, 87b of zero-order diffraction light 87 passing through the diffraction fields 84, 85 are radiated to the information medium 64 after the beams 87a, 87b are respectively converged by the objective lens 65.

Thereafter, when the zero-order diffraction light 87 is reflected by the information medium 64, the beams 87a, 87b of the light 87 are diffracted by a track pit indicating a piece of information to form diffraction patterns in the beams 87a, 87b. Therefore, the intensity distribution of the zero-order diffraction light 87 diffracted is changed depending on the relation in position between the zero-order diffraction light 87 focused on the information medium 64 and the track pit formed in the information medium 64.

Thereafter, the zero-order diffraction light 87 is fed back to the incoming optical path. Therefore, the zero-order diffraction light 87 is radiated to the diffraction fields 84, 85 of the hologram 82 after passing through the objective lens 65. Thereafter, the zero-order diffraction light 87 radiated to the diffraction region 84 is diffracted, and a beam 88a of first-order diffraction light 88 mainly occurs. Also, the zero-order diffraction light 87 radiated to the diffraction region 85 is diffracted, and a beam 88b of the first-order diffraction light 88 mainly occurs. The beam 88a of the first-order diffraction light 88 is radiated to the detecting section S70 of the photo detector 86, and the beam 88b of the first-order diffraction light 88 is radiated to the detecting section S80 of the photo detector 86. In this case, the third focal length $f_3$ of the diffraction regions 84, 85 is set to converge the beams 88a, 88b of the first-order diffraction light 88 at the detecting sections S70, S80 of the photo detector 86 on condition that the diffraction regions 84, 85 respectively functions as a lens are defocus on the photo detector 86.

Thereafter, the intensity of the beam 88a of the first-order diffraction light 88 is detected in the detecting section S70 of the photo detector 86 and is changed to an electric current signal S70 in an electric circuit 89. Also, the intensity of the beam 88b of the first-order diffraction light 88 is detected in the detecting section S80 of the photo detector 86 and is changed to an electric current signal S80 in the electric circuit 89. Thereafter, a tracking error signal $S_{te}$ is calculated in the electric circuit 89 according to an equation (3).

$$S_{te} = S70 - S80 \qquad (3)$$

Thereafter, the objective lens 65 is moved in a radial direction so as to reduce a tracking error indicated by the tracking error signal $S_{te}$. The radial direction is defined as a direction perpendicular to both the optical path and the track pit. Therefore, a converging spot of the zero-order diffraction light 70 on the information medium 64 can be formed in the middle of the track pit, so that the tracking error becomes zero.

Accordingly, because tracking error information is transferred to the photo detector 84 by the first-order diffraction light 88 after being transferred to the diffraction regions 84, 85 of the blazed hologram 82 by the zero-order diffraction light 87, the position of the objective lens 65 can be properly adjusted in the radial direction to reduce the tracking error.

Next, the action of unnecessary light such as N-order diffraction light (N = −1, 1, 2, - - - ) of the outgoing optical path and (N+1)-order diffraction light of the incoming optical path is described.

The light beam 75 radiated from the light beam source 62 is diffracted in the diffraction fields 84, 85 of the blazed hologram 82, and beams 89a, 89b of unnecessary light 89 of the outgoing optical path occur in some degree. In this case, because the blazed hologram 82 functions as a lens for the unnecessary light 89, the unnecessary light 89 is converged at the information medium 64 on condition that the objective lens 65 is defocused on the information medium 64. Therefore, a first comparatively large converging spot of the beam 89a of the unnecessary light 89 is formed on one or more track pits of the information medium 64, and a second comparatively large converging spot of the beam 89b of the unnecessary light 89 is formed on one or more track pits of the information medium 64. As a result, the intensity distribution of the unnecessary light 89 diffracted hardly varies regardless of the relation in position between each of the converging spots of the unnecessary light 89 on the information medium 64 and the track pits of the information medium 64.

Accordingly, because the unnecessary light 89 radiated to the photo detector 84 does not influence the tracking error signal $S_{te}$, the reduction of the tracking error can be performed with high accuracy.

Next, a third embodiment is described with reference to FIGS. 11 and 12.

Figure 11:
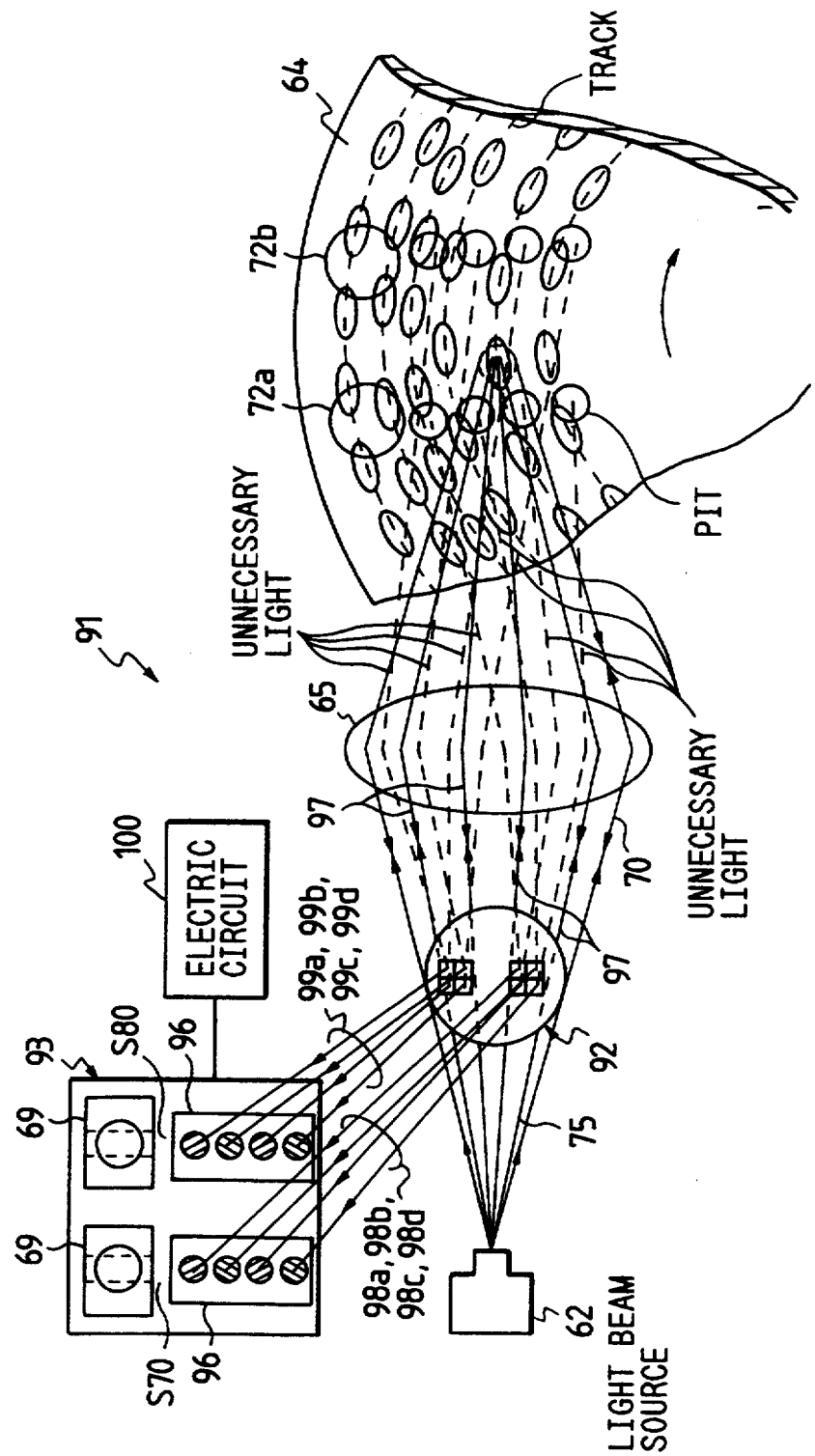
FIG. 11 is a constitutional view of an optical head apparatus according to a third embodiment of the present invention.

FIG. 11 is a constitutional view of an optical head apparatus according to a third embodiment of the present invention.

As shown in FIG. 11, an optical head apparatus 91 for reading information from the information medium 64, comprises the light beam source 62, a transmission type of blazed hologram 92 for transmitting a light beam radiated from the light beam source 62 in an outgoing optical path to produce first-order diffraction light and diffracting the zero-order diffraction light reflected in the information medium 64 in an incoming optical path to produce first-order diffraction light, the objective lens 65, and a photo detecting apparatus 93 for detecting the intensity of the first-order diffraction light diffracted by the blazed hologram 92.

Figure 12:
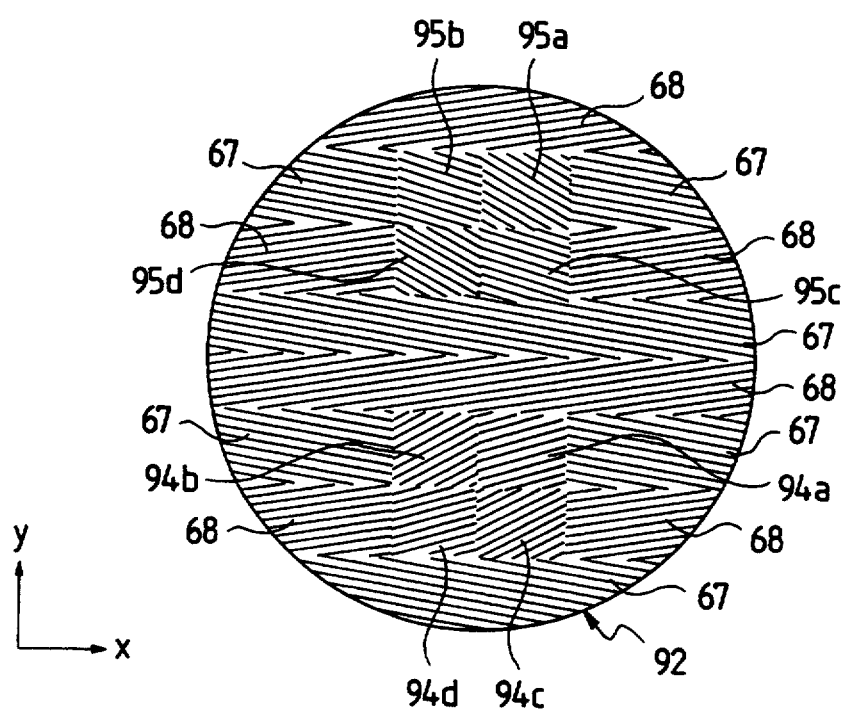
FIG. 12 is a plan view of a blazed hologram utilized in the optical head apparatus shown in FIG. 11, showing a hologram pattern of the blazed hologram.

As shown in FIG. 12, the blazed hologram 92 has the first and second focus error detective diffraction regions 67, 68, and a pair of four-partitioned tracking error detective diffraction regions 94, 95 for changing zero-order diffraction light to first-order diffraction light utilized to detect a tracking error. The diffraction region 94 has four sub-partitioned diffraction regions 94a, 94b, 94c, 94d, and diffraction directions of beams of diffraction light diffracted in the sub-partitioned regions differ from one another. Also, the diffraction region 95 has four sub-partitioned diffraction regions 95a, 95b, 95c, 95d, and diffraction directions of beams of diffraction light diffracted in the sub-partitioned diffraction regions differ from one another.

The photo detecting apparatus 93 has the six-division photo detector 69 and a tracking error photo detector 96 in which two detecting section S70 and S80 are provided. In cases where four beams of first-order diffraction light of an incoming optical path occurs in the sub-partitioned diffraction regions of the diffraction region 94, the four beams of the first-order diffraction light are independently radiated to four radiation portions in the detecting section S70 of the photo detector 96. Also, in cases where four beams of first-order diffraction light of the incoming optical path occurs in the sub-partitioned diffraction regions of the diffraction region 95, the four beams of the first-order diffraction light are independently radiated to four radiation portions in the detecting section S8 of the photo detector 96.

In the above configuration, the information stored in the information medium 64 is detected in the photo detector 69 while reducing the focusing error, in the same manner as in the first embodiment. Therefore, the objective lens 65 is adjusted to be focused on the information medium 64, and the information signal $S_{in}$ is obtained.

A zero-order diffraction light 97 diffracted by the blazed hologram 92 in the outgoing optical path is diffracted by a track pit of the information medium 64 to form diffraction patterns in the light 97, in the same manner as in the second embodiment. Thereafter, the zero-order diffraction light 97 is radiated to the blazed hologram 92 and is diffracted in the diffraction region 94. Therefore, beams 98a to 98d of first-order diffraction light 98 mainly occur in the sub-partitioned diffraction regions 94a, 94b, 94c, and 94d of the diffraction field 94. Also, the zero-order diffraction light 97 is radiated to the blazed hologram 92 and is diffracted in the diffraction region 95. Therefore, beams 99a to 99d of first-order diffraction light 99 mainly occur in the sub-partitioned diffraction regions 95a, 95b, 95c, and 95d of the diffraction field 95. In this case, an numerical aperture NA of each of the sub-partitioned diffraction regions 94a to 94d and 95a to 95d is lessen as compared of the diffraction regions 94, 95 because the sub-partitioned diffraction regions respectively have a small size. Therefore, the beams 98a to 98d of the first-order diffraction light 98 are greatly diffracted in the diffraction directions and are radiated to the detecting section S70 of the photo detector 96, and the beams 99a to 99d of the first-order diffraction light 99 are greatly diffracted in the diffraction directions and are radiated to the detecting section S80 of the photo detector 96.

Thereafter, the intensities of the beams 98a to 98d of the first-order diffraction light 98 are detected in the radiation portions of the detecting section S70 and are changed to four electric current signals S70a, S70b, S70c, S70d in an electric circuit 100. Also, the intensities of the beams 99a to 99d of the first-order diffraction light 99 are detected in the radiation portions of the detecting section S70 and are changed to four electric current signals S80a, S80b, S80c, S80d in the electric circuit 100. Thereafter, a tracking error signal $S_{te}$ is calculated in the electric circuit 100 according to an equation (4).

$$S_{te} = (S70a + S70b + S70c + S70d) - (S80a + S80b + S80c + S80d) \quad (4)$$

Thereafter, the objective lens 65 is moved in the radial direction so as to reduce a tracking error indicated by the tracking error signal $S_{te}$. Therefore, a converging spot of the zero-order diffraction light 70 on the information medium 64 can be formed in the middle of the track pit, so that the tracking error becomes zero.

Accordingly, because tracking error information is transferred to the photo detector 96 by the first-order diffraction light 98, 99 after being transferred to the diffraction regions 94, 95 of the blazed hologram 92 by the zero-order diffraction light 97, the position of the objective lens 65 can be properly adjusted to reduce the tracking error, in the same manner as in the second embodiment.

Next, the action of unnecessary light such as N-order diffraction light (N= −1, 1, 2, - - - ) of the outgoing optical path and (N+1)-order diffraction light of the incoming optical path is described.

The light beam 75 radiated from the light beam source 62 is diffracted in the sub-partitioned diffraction regions 94a to 94d and 95a to 95d of the diffraction fields 94, 95 in the blazed hologram 92, and beams of unnecessary light of the outgoing optical path occurs in some degree. In this case, because the numerical aperture NA of each of the sub-partitioned diffraction regions 94a to 94d and 95a to 95d is lessen, the beams of the unnecessary light are greatly diffracted. Therefore, comparatively large converging spots of the beams of the unnecessary light are formed on many track pits of the information medium 64. As a result, when the unnecessary light is diffracted by undesired track pits of the information medium 64, the intensity distribution of each of the beams of the unnecessary light hardly varies regardless of the relation in position between each of the converging spots of the unnecessary light on the information medium 64 and the track pits of the information medium 64.

Accordingly, because the numerical apertures NA of the diffraction regions 94, 95 are lessened by dividing the diffraction regions 94, 95 into the sub-partitioned diffraction regions, the beams of the unnecessary light passing through the sub-partitioned diffraction regions can be greatly diffracted to form large converging spots on the information medium 64. Therefore, because many pieces of undesired original information stored in the information medium 64 are read by each of the beams of the unnecessary light, and the undesired original information are detected as a piece of average information in the photo detector 96. As a result, the unnecessary light radiated to the photo detector 96 does not influence the tracking error signal $S_{te}$, and the reduction of the tracking error can be performed with high accuracy.

In the third embodiment, each of the diffraction regions 94, 95 is partitioned into four pieces to lessen the numerical apertures NA of the diffraction regions 94, 95. However, the number of the partition is not limited to four. That is, it is preferred that each of the diffraction regions 94, 95 be partitioned into a large number of pieces to moreover lessen the numerical apertures NA of the diffraction regions 94, 95.

Also, each of the sub-partitioned diffraction regions of the diffraction regions 94, 95 does not function as a lens in the third embodiment. However, it is preferred that each of the sub-partitioned diffraction regions of the diffraction regions 94, 95 function as a lens in the same manner as the diffraction regions 84, 85 in the second embodiment. In this case, the converging spots of the beams of the unnecessary light are moreover enlarged in size because the objective lens 65 is defocused on the information medium 64. Accordingly, more pieces of information stored in the information medium 64 are read by each of the beams of the unnecessary light, so that the unnecessary light radiated to the photo detector 96 does not influence the tracking error signal $S_{te}$. That is, the reduction of the tracking error can be performed with high accuracy.

Next, a fourth embodiment is described with reference to FIGS. 13 and 14.

In the fourth embodiment, noise included in an information signal is reduced according to the principle which has been disclosed in Japanese Patent Application No. 138748 of 1985 and Japanese Patent Application No. 131245 of 1986.

Figure 13:
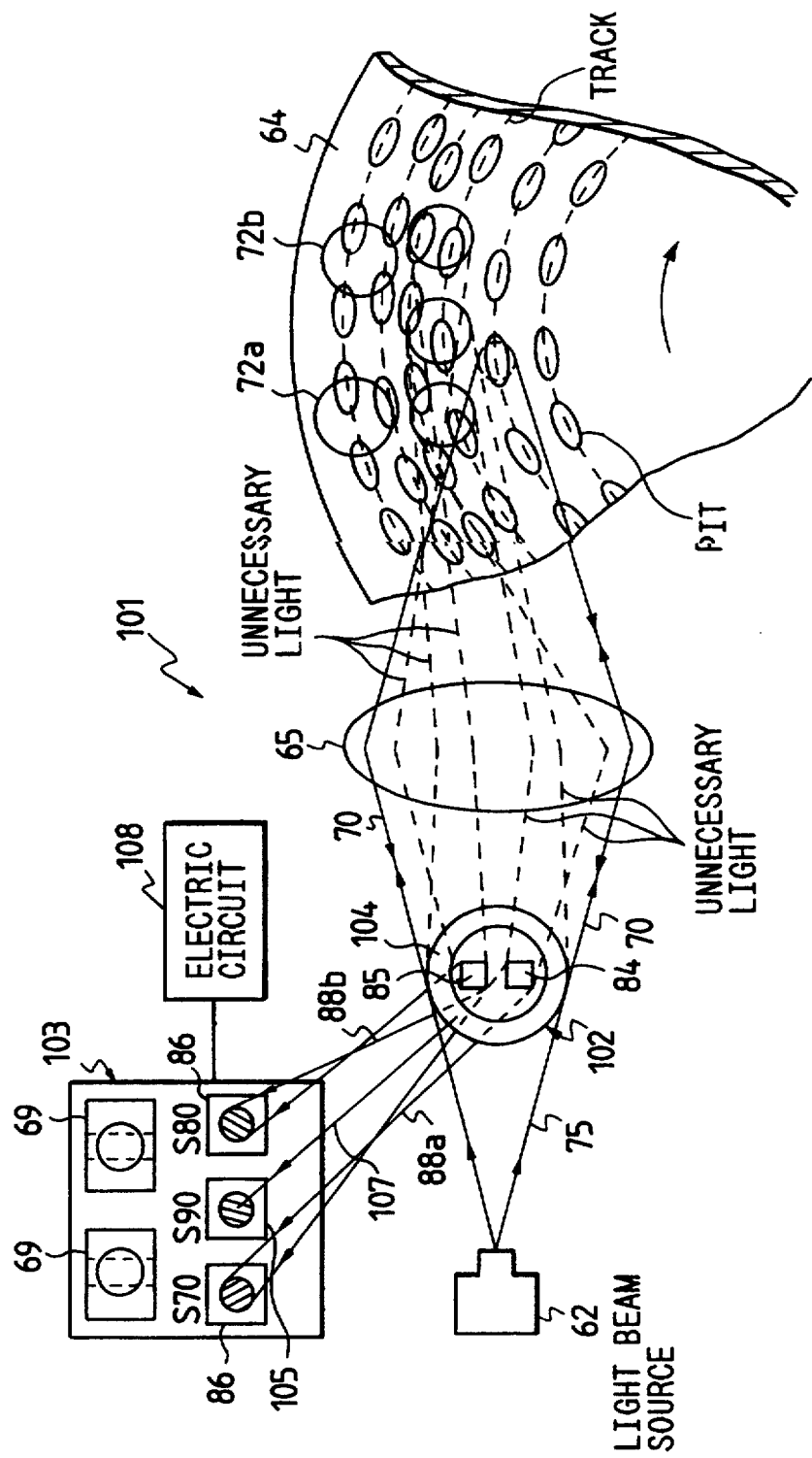
FIG. 13 is a constitutional view of an optical head apparatus according to a fourth embodiment of the present invention.

FIG. 13 is a constitutional view of an optical head apparatus according to a fourth embodiment of the present invention.

As shown in FIG. 13, an optical head apparatus 101 for reading information from the information medium 64, comprises the light beam source 62, a transmission type of blazed hologram 102 for transmitting a light beam radiated from the light beam source 62 in an outgoing optical path to produce first-order diffraction light and diffracting the zero-order diffraction light reflected in the information medium 64 in an incoming optical path to produce first-order diffraction light, the objective lens 65, and a photo detecting apparatus 103 for detecting the intensity of the first-order diffraction light diffracted by the blazed hologram 102.

Figure 14:
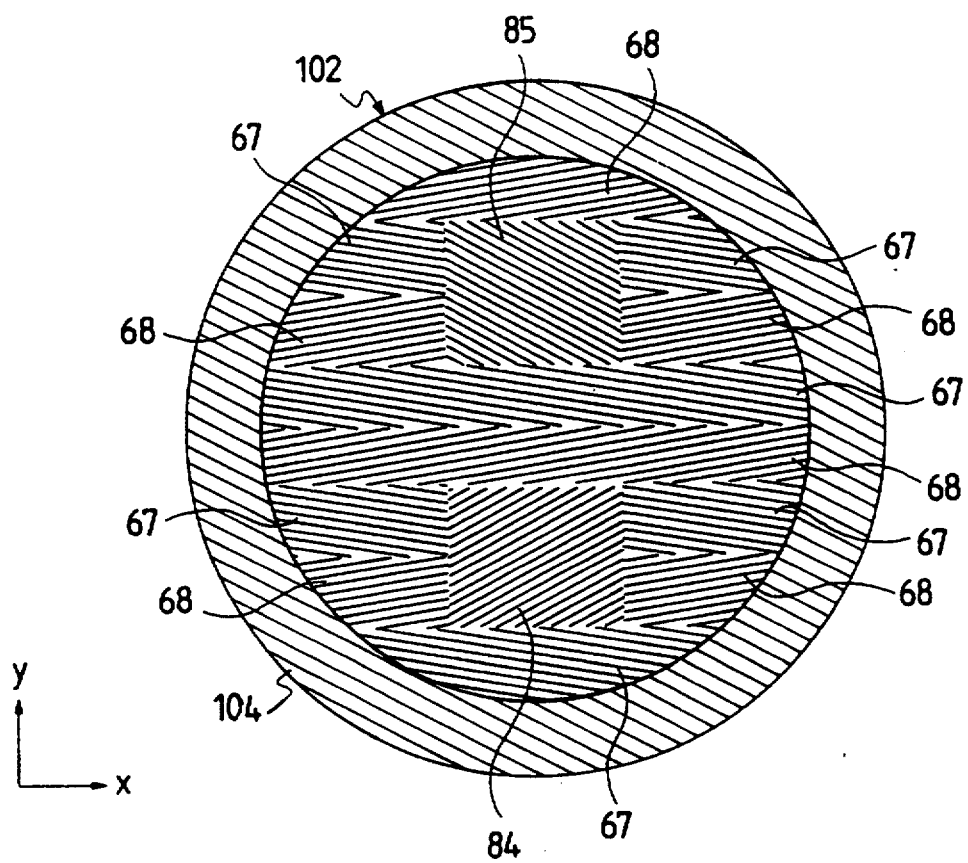
FIG. 14 is a plan view of a blazed hologram utilized in the optical head apparatus shown in FIG. 13, showing a hologram pattern of the blazed hologram.

As shown in FIG. 14, the blazed hologram 102 has the first and second focus error detective diffraction regions 67, 68, the tracking error detective diffraction regions 84, 85, a peripheral diffraction region 104 in which a peripheral part of the light beam is diffracted to emphasize information stored in the information medium 64 with high memory density. The peripheral diffraction region 104 has a hologram pattern functioning as a lens for the diffraction light.

The photo detecting apparatus 103 has the six-division photo detector 69, the tracking error photo detector 86, a noise reducing photo detector 105 in which a detecting section S90 is provided to receive the light beam diffracted in the peripheral diffraction region 104, and an electric circuit 108 for changing the intensity of the first-order diffraction light detected in the six-division photo detector 69, the tracking error photo detector 86 and the noise reducing photo detector 105 to electric current signals.

In the above configuration, the first-order diffraction light 71 is detected in the photo detector 69 to reduce the focusing error in the same manner as in the first embodiment, so that the objective lens 65 is adjusted to be focused on the information medium 64 for the zero-order diffraction light 87.

Also, the first-order diffraction light 88 is detected in the photo detector 86 to reduce the tracking error in the same manner as in the second embodiment, so that the objective lens 65 is adjusted in the radial direction to form the center of the converging spot of the zero-order diffraction light 70 in the middle of the tracking pit.

Also, when the light beam 75 radiated from the light beam source 62 is radiated to the blazed hologram 102, a beam of zero-order diffraction light 106 mainly occurs. Thereafter, the zero-order diffraction light 106 of an outgoing optical path passes through the blazed hologram 102 and the object lens 65 and is radiated to the information medium 64. In this case, because the blazed hologram 102 functions as a transparent plate for the zero-order diffraction light 106, the beam of the zero-order diffraction light 106 is converged at the information medium 64 on condition that the objective lens 65 is just focused on the information medium 64 for the zero-order diffraction light, and a small converging spot of the zero-order diffraction light 106 is formed on a track pit of the information medium 64. Therefore, information stored in the track pit of the information medium 64 is read by the diffraction light 106. In this case, when the information is stored with high memory density in the information medium 64, the information is transferred by the diffraction light 106 in high spatial frequency. That is, the information stored with high memory density are indicated by high spatial frequency components of the diffraction light 106, and the information stored with low memory density are indicated by low spatial frequency components of the diffraction light 106. Also, the information transferred in high spatial frequency tends to shift to the periphery of the beam of the diffraction light 106.

Thereafter, the diffraction light 106 is fed back to the blazed hologram 102. In this case, the diffraction light 106 transferring the information stored with high memory density is mainly diffracted in the periphery diffraction region 104, and a beam of first-order diffraction light 107 occurs in the periphery diffraction region 104. The diffraction light 107 is converged at the photo detector 105, and the intensity of the diffraction light 107 is detected. Thereafter, the intensity detected is changed to an electric current signal S90 in the electric circuit 108. Thereafter, an information signal $S_{in}$ is obtained in the electric circuit 108 by adding all of the electric current signals relating to the intensities of first-order diffraction light detected in the photo detecting apparatus 108 according to an equation (5).

$$S_{in} = (S10 + S20 + S30 + S40 + S50 + S60 + S70 + S80) + Wf \cdot S90 \quad (5)$$

Where the symbol Wf (Wf>1) is a weighting factor. Because the electric current signal S90 relating to the intensity of the diffraction light 107 is weighted by the weighting factor Wf, the contribution of the information stored with high memory density in the information medium 64 to the information signal $S_{in}$ is emphasized.

Accordingly, even though information stored in the information medium 64 is generally difficult to be distinctly read because the information is stored with high memory density, the information stored with high memory density can be distinctly read from the information medium 64 because the information is emphasized.

Also, because the intensity of the diffraction light 107 relating to the electric current signal S90 is independently detected in the photo detector 105, the intensity of the diffraction light 107 can be easily detected with high accuracy. Therefore, when the information is stored with high memory density, the information signal $S_{in}$ can be obtained with high accuracy because the contribution of the electric current signal S90 to the information signal $S_{in}$ is comparatively large.

Also, as shown in FIG. 13, unnecessary light is radiated to the information medium 64 to form a comparatively large spot on the information medium 64 so that noise included in the information signal $S_{in}$ is reduced in the same manner as in the first embodiment. In addition, because noise components mainly exist in low spatial frequency, the noise in the information signal $S_{in}$ is moreover reduced because the information transferred in high spatial frequency is selectively emphasized.

Next, a fifth embodiment is described with reference to FIGS. 15 and 16.

Figure 15:
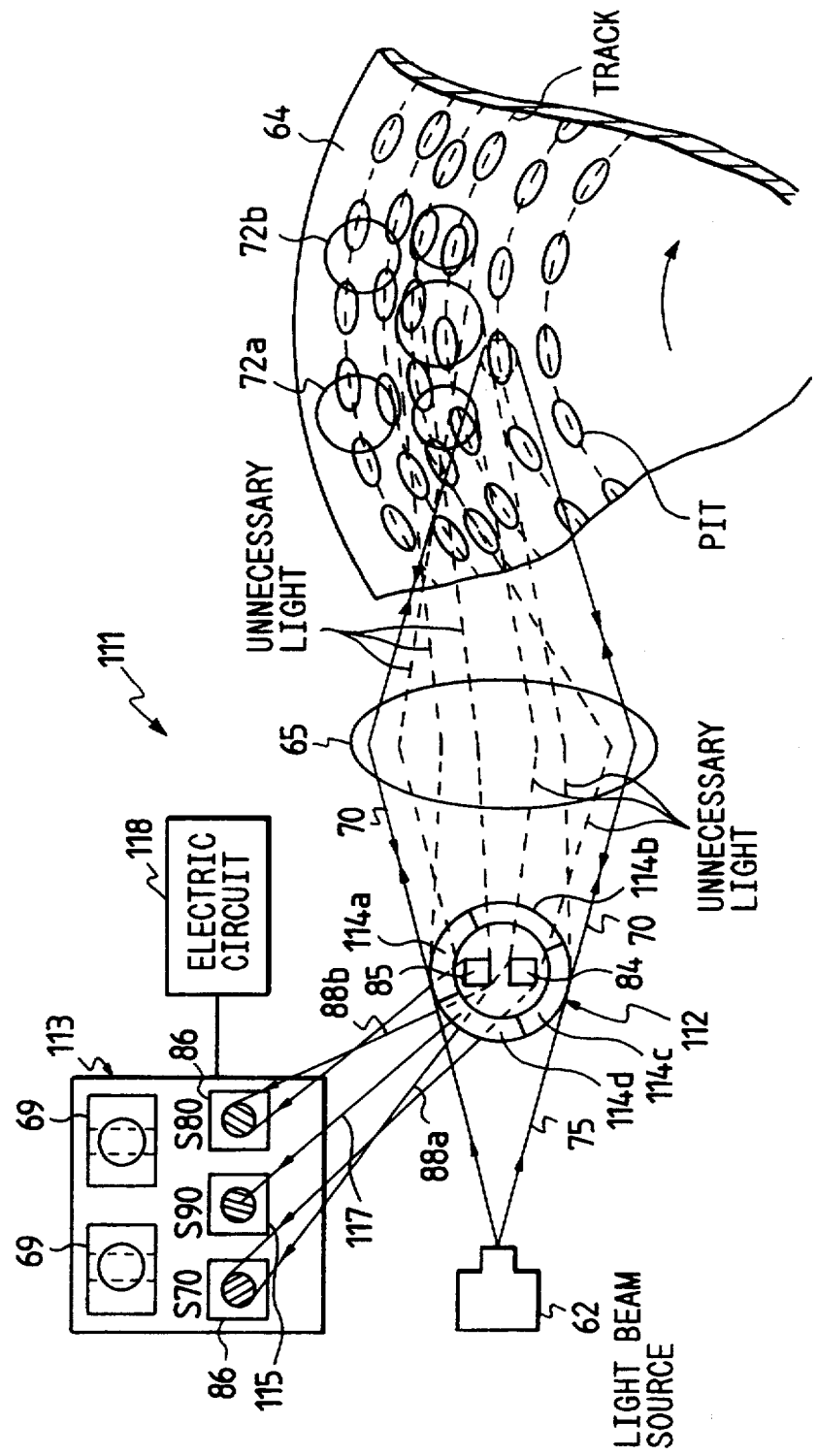
FIG. 15 is a constitutional view of an optical head apparatus according to a fifth embodiment of the present invention.

FIG. 15 is a constitutional view of an optical head apparatus according to a fifth embodiment of the present invention.

As shown in FIG. 15, an optical head apparatus 111 for reading information from the information medium 64, comprises the light beam source 62, a transmission type of blazed hologram 112 for transmitting a light beam radiated from the light beam source 62 in an outgoing optical path to produce zero-order diffraction light and diffracting the zero-order diffraction light reflected in the information medium 64 in an incoming optical path to produce first-order diffraction light, the objective lens 65, and a photo detecting apparatus 113 for detecting the intensity of the first-order diffraction light diffracted by the blazed hologram 112.

Figure 16:
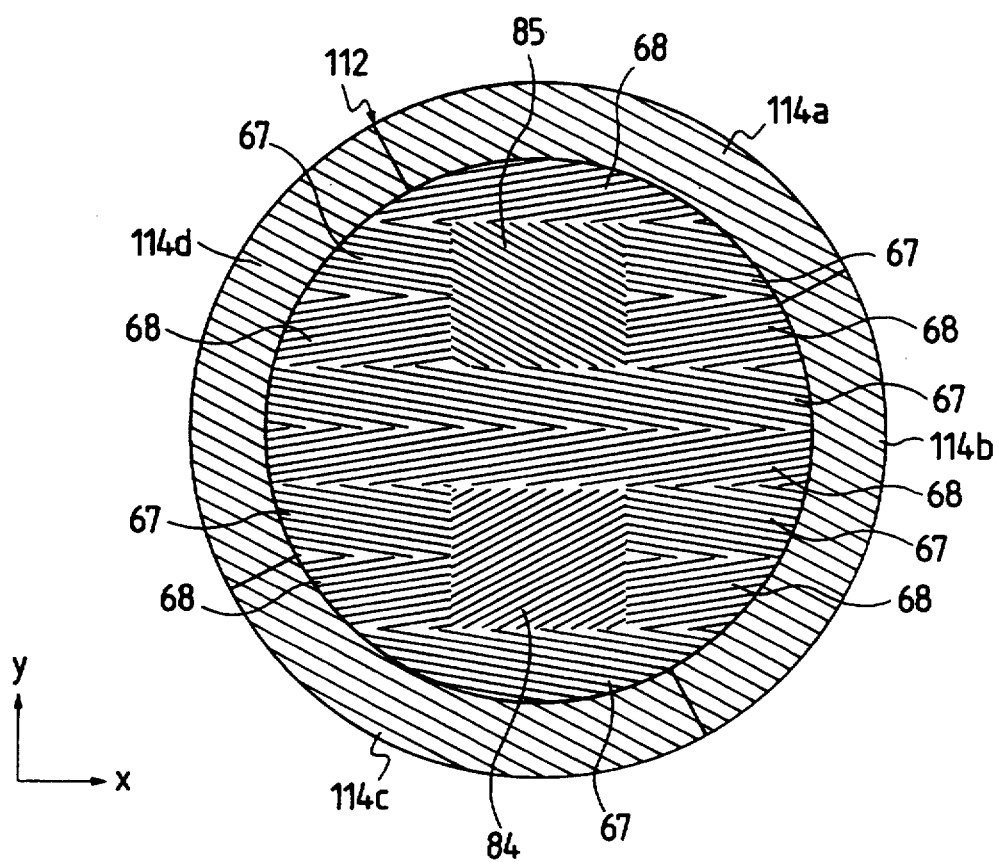
FIG. 16 is a plan view of a blazed hologram utilized in the optical head apparatus shown in FIG. 15, showing a hologram pattern of the blazed hologram.

As shown in FIG. 16, the blazed hologram 112 has the first diffraction regions 67, the second diffraction regions 68, the diffraction regions 84, 85, four peripheral diffraction regions 114 (114a, 114b, 114c, and 114d) in which peripheral parts of the light beam is diffracted to emphasize information stored in the information medium 64 with high memory density. Diffraction directions of beams of diffraction light diffracted in the peripheral diffraction regions 114 differ from one another.

The photo detecting apparatus 113 has the six-division photo detector 69, the tracking error photo detector 86, and a noise reducing photo detector 115 in which a detecting section S90 is provided. In cases where four beams of first-order diffraction light of an incoming optical path occur in the peripheral diffraction regions 114 of the blazed hologram 112, the four beams of the first-order diffraction light are independently radiated to four radiation portions in the detecting section S90 of the photo detector 115.

In the above configuration, the first-order diffraction light 71 is detected in the photo detector 69 to reduce the focusing error in the same manner as in the first embodiment, so that the objective lens 65 is adjusted to be focused on the information medium 64 for the zero-order diffraction light 87.

Also, the first-order diffraction light 88 is detected in the photo detector 84 to reduce the tracking error in the same manner as in the second embodiment, so that the objective lens 65 is adjusted in the radial direction to form the converging spot of the zero-order diffraction light 70 in the middle of the track pit.

Also, information stored in the track pit of the information medium 64 is read by zero-order diffraction light 116 ocurring in the blazed hologram 112, in the same manner as in the fourth embodiment. In cases where the information is stored with high memory density in the information medium 64, the information is transferred by the diffraction light 116 in high spatial frequency.

Thereafter, the diffraction light 116 is fed back to the blazed hologram 112. In this case, the diffraction light 116 transferring the information stored with high memory density tends to be diffracted in the periphery diffraction regions 114, and beams of first-order diffraction light 117 occur in the periphery diffraction regions 114. In this case, each of the beams is greatly diffracted because a numerical aperture NA of each of the periphery diffraction regions 114 is smaller than that of the periphery diffraction region 104. The beams of the diffraction light 117 are radiated to the radiation portions of the photo detector 115, and the intensities of the beams are respectively detected. Thereafter, the intensities detected are changed to electric current signals S90a, S90b, S90c, and S90d in an electric circuit 118. Thereafter, an information signal $S_{in}$ is calculated in the electric circuit 118 by adding all of the electric current signals relating to the intensities of first-order diffraction light detected in the photo detecting apparatus 113 according to an equation (6).

$$S_{in} = (S10 + S20 + S30 + S40 + S50 + S60 + S70 + S80) + Wf*(S90a + S90b + S90c + S90d) \tag{6}$$

Because the electric current signals S90a to S90d relating to the intensities of the beams of the diffraction light 117 are weighted by the weighting factor Wf, the contribution of the information stored with high memory density in the information medium 64 to the information signal $S_{in}$ is emphasized in the same manner as in the fourth embodiment.

Accordingly, the information stored with high memory density can be distinctly read from the information medium 64 because the information is emphasized.

Also, because the intensities of the beams of the diffraction light 117 relating to the electric current signals S90a to S90d are independently detected in the photo detector 115, the intensities of the beams can be easily detected with high accuracy. Therefore, when the information is stored with high memory density, the information signal $S_{in}$ can be obtained with high accuracy because the contribution of the electric current signals S90a to S90d to the information signal $S_{in}$ is comparatively large.

Also, because the periphery diffraction region 114 is partitioned into four, unnecessary light diffracted at the periphery diffraction region 114 is greatly diffracted. Therefore, unnecessary light diffracted at the blazed hologram 112 is radiated to the information medium 64 to form a comparatively large spot on the information medium 64 so that noise included in the information signal S$in$ is reduced in the same manner as in the third embodiment. In addition, because noise components mainly exist in low spatial frequency, the noise in the information signal $S_{in}$ is moreover reduced because the information transferred in high spatial frequency is selectively emphasized.

In the fifth embodiment, the periphery diffraction region 114 is partitioned into four pieces to lessen the numerical apertures NA of the periphery diffraction region 114. However, the number of the partition is not limited to four. That is, it is preferred that the periphery diffraction region 114 be partitioned into a large number of pieces to moreover lessen the numerical apertures NA of the periphery diffraction region 114.

Also, each of the periphery diffraction regions 114a to 114d does not function as a lens in the fifth embodiment. However, it is preferred that each of the periphery diffraction region 114a to 114d function as a lens in the same manner as the periphery diffraction region 104 in the fourth embodiment. In this case, the converging spots of the beams of the unnecessary light are moreover enlarged in size because the objective lens 65 is defocused on the information medium 64. Accordingly, more pieces of information stored in the information medium 64 are read by each of the beams of the unnecessary light, so that the unnecessary light radiated to the photo detector 115 does not influence the information signal $S_{in}$. That is, an S/N ratio of the information signal to noise can be improved.

Figure 1:
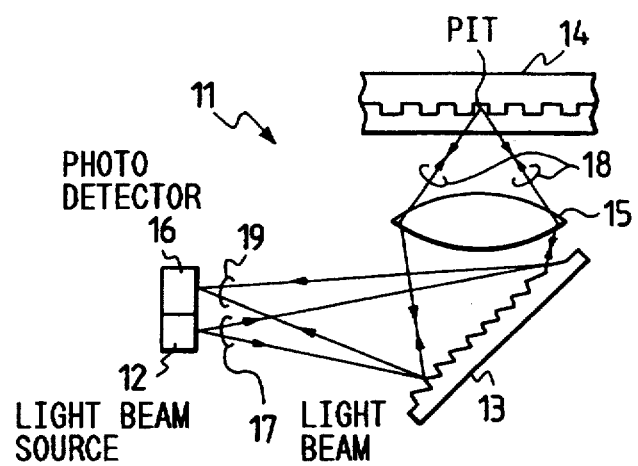
FIG. 1 is a constitutional view of a conventional optical head apparatus proposed in Japanese Patent Application No. 46630 of 1991.
Figure 2A:
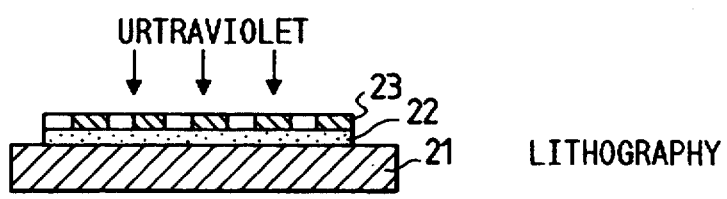
FIGS. 2A to 2F are cross-sectional views showing a method for manufacturing a blazed hologram shown in FIG. 1.
Figure 2B:
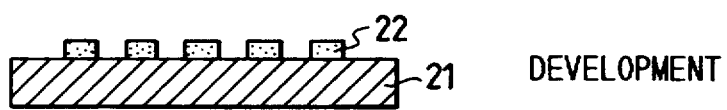
Figure 2C:
Figure 2D:
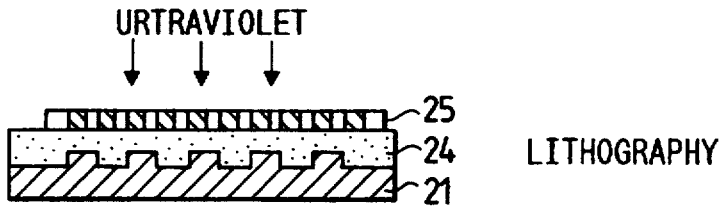
Figure 2E:
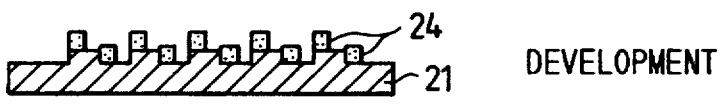
Figure 2F:
Figure 3:
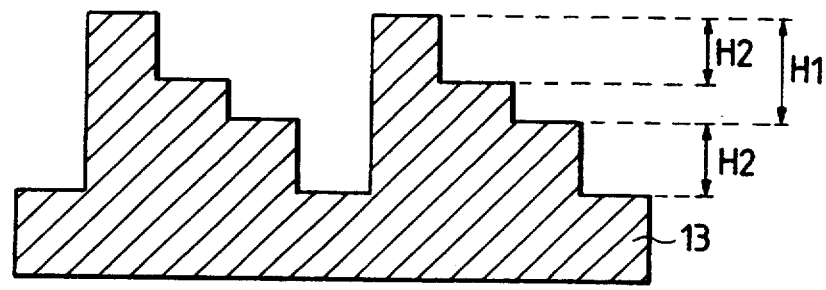
FIG. 3 is an enlarged cross-sectional view showing a part of the blazed hologram shown in FIG. 1, the blazed hologram being manufactured according to the method shown in FIGS. 2A to 2F.
Figure 4:
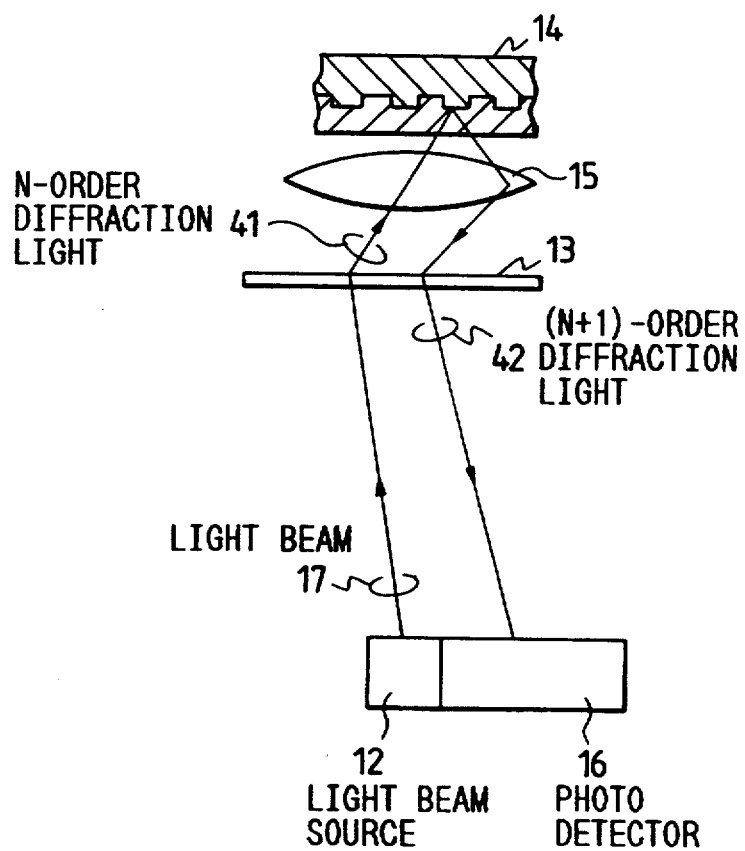
FIG. 4 is a constitutional view of a conventional optical head apparatus showing N-order diffraction lights of an outgoing optical path and (N+1)-order diffraction lights of an incoming optical path which occur in a blazed hologram.

In the first to fifth embodiments, a blazed pattern on the surface of each of the blazed holograms 63, 82, 92, 102, and 112 is formed in the echelon shape shown in FIG. 3. However, the blazed pattern is not limited to the echelon shape.

Also, each of the blazed holograms 63, 82, 92, 102, and 112 is separated from the objective lens 65. However, it is preferred that each of the blazed holograms be integrally formed with the objective lens 65. In this case, even though the objective lens 65 is moved according to the focus error signal $S_{fe}$ or the tracking error signal $S_{te}$ or is moved by external vibration, the position the zero-order diffraction light reflected from the information medium 64 on the hologram is not moved. As a result, the focus servo signal relating to the focus error signal $S_{fe}$, a tracking servo signal relating to the tracking error signal $S_{te}$ and the information signal $S_{in}$ does not deteriorate.

Figure 17:
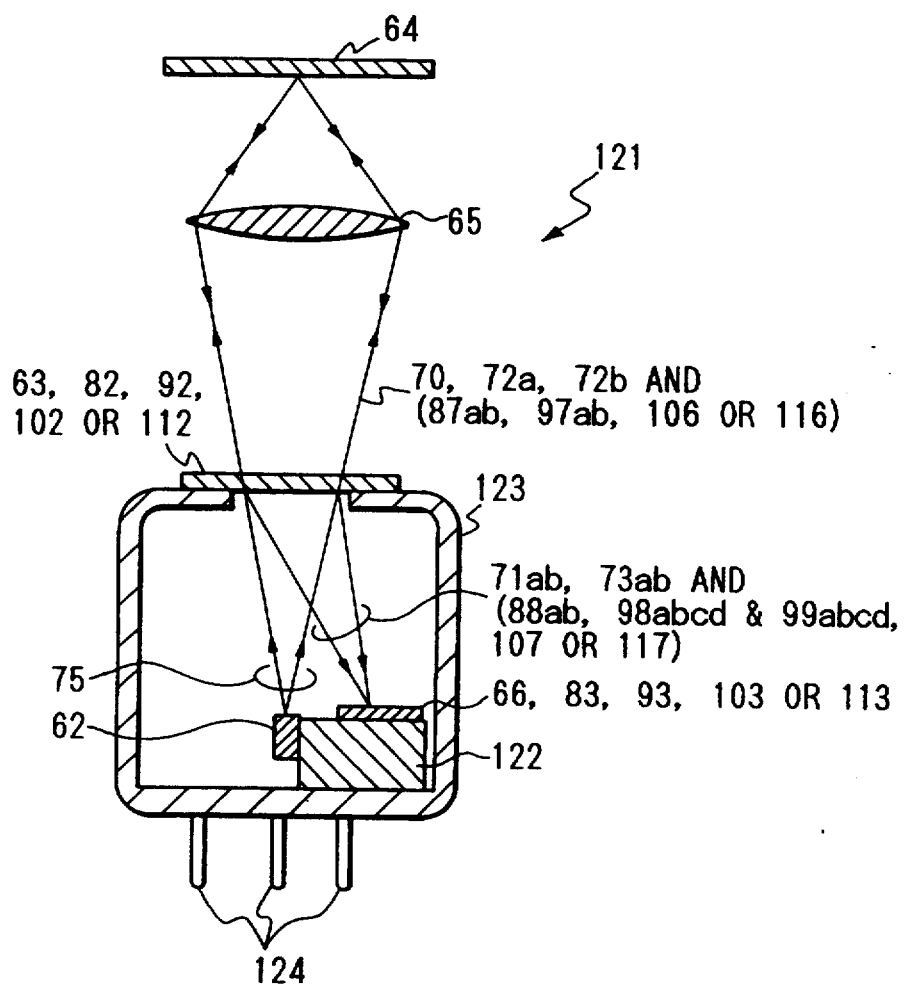
FIG. 17 is a constitutional view of an optical head apparatus according to a six embodiment of the present invention.

FIG. 17 is a constitutional view of an optical head apparatus according to a six embodiment.

As shown in FIG. 17, an optical head apparatus 121 for reading information from the information medium 64, comprises the light beam source 62, the photo detecting apparatus 66 (or 83, 93, 103, 113), a heat radiation base 122 for radiating heat generated in the light beam source 62 and the apparatus 66, a housing 123 for accommodating the light beam source 62, the apparatus 66 and the base 122, control terminals 124 for transmitting a light beam source operating signal, the information signal $S_{in}$, the focus error signal $S_{fe}$ and the tracking error signal $S_{tr}$, the blazed hologram 63 (or 82, 92, 102, 112) fixed on the housing 123, and the objective lens 65.

In the above configuration, the blazed hologram 63 is utilized as a radiation window of the housing 123 to transmit the light beam radiated from the light beam source 63. Also, the blazed hologram 63 is utilized as a sealing arrangement to enclose the light beam source 62 and the photo detecting apparatus 66. Therefore, because the light beam source 62 and the photo detecting apparatus 66 are packed in the housing 123, the distance between the light beam source 62 and the photo detecting apparatus 66 becomes narrow.

Also, the number of housing required to pack the light beam source 62 and the photo detecting apparatus 66 is only one, and any holder for holding the blazed hologram 63 is not additionally required. Therefore, the number of parts required to manufacture the optical head apparatus 121 can be reduced.

Accordingly, a small-sized and lightweight optical head apparatus can be manufactured at a low cost.

In the first to sixth embodiments, each of the blazed holograms 63, 82, 92, 102, and 112 is arranged perpendicular to an optical axis of the light beam 75. However, it is applicable that the blazed holograms 63, 82, 92, 102, and 112 be arranged on a slant with respect to the optical axis of the light beam 75 to arrange the optical head apparatuses 61, 81, 91, 101, 111, 121 in a limited space. In this case, the blazed hologram 82 has a hologram pattern shown in FIG. 18, and the blazed hologram 102 has a hologram pattern shown in FIG. 19.

Next, an optical head apparatus in which a reflection type of blazed hologram is utilized is described according to the concepts of the first to fifth embodiments.

Figure 20:
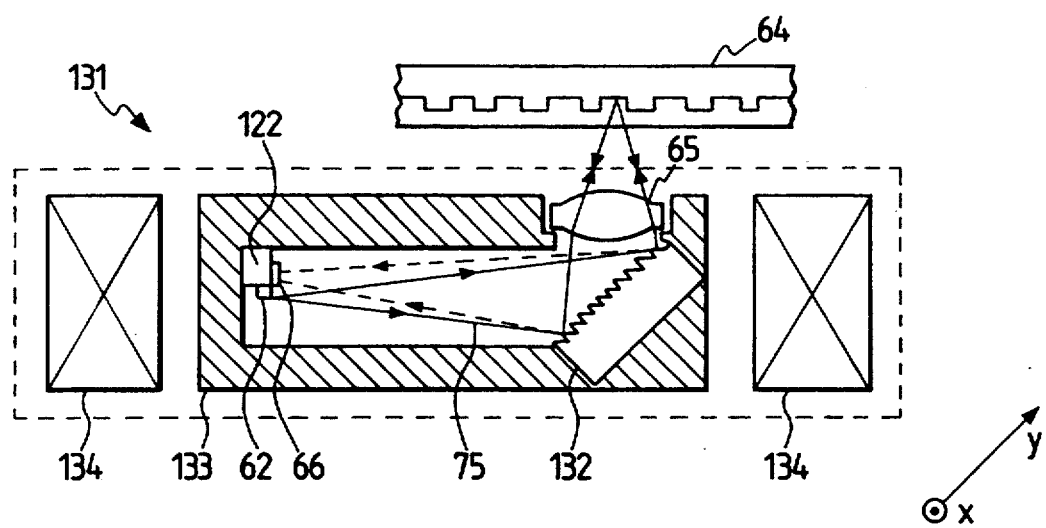
FIG. 20 is a constitutional view of an optical head apparatus according to a seven embodiment of the present invention.

FIG. 20 is a constitutional view of an optical head apparatus according to a seven embodiment.

As shown in FIG. 20, an optical head apparatus 131 for reading information from the information medium 64, comprises the light beam source 62, the photo detecting apparatus 66 (or 83, 93, 103, 113), the heat radiation base 122, a reflection type of blazed hologram 132, the objective lens 65, a box type of housing 133 for accommodating the light beam source 62, the apparatus 66, the base 122, the blazed hologram 132 and the objective lens 65, and an actuator 134 for actuating the housing 133 according to the focus error signal $S_{fe}$ and the tracking error signal $S_{tr}$ to adjust the position of the objective lens 65.

Figure 18:
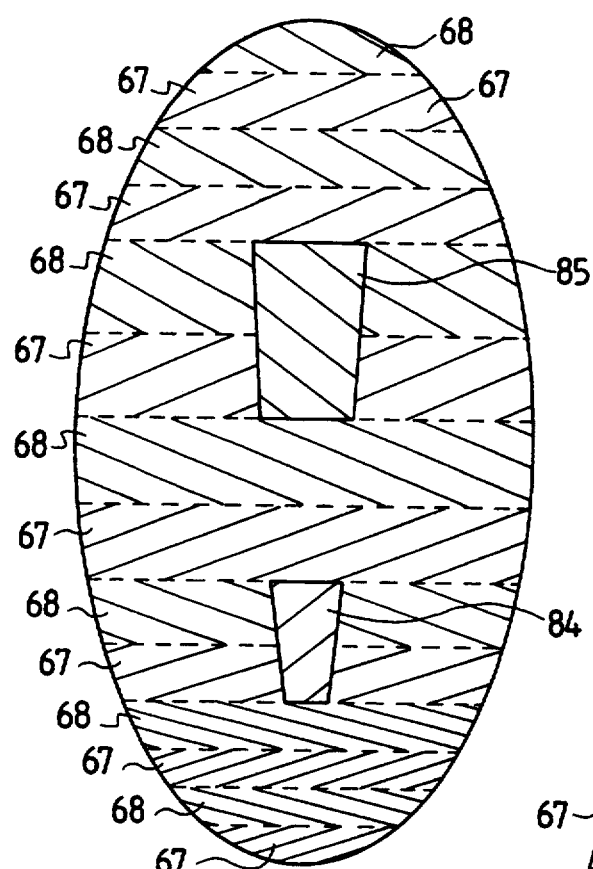
FIG. 18 is a plan view of a blazed hologram utilized in an optical head apparatus according to a modification of the second embodiment, showing a hologram pattern of the blazed hologram.
Figure 19:
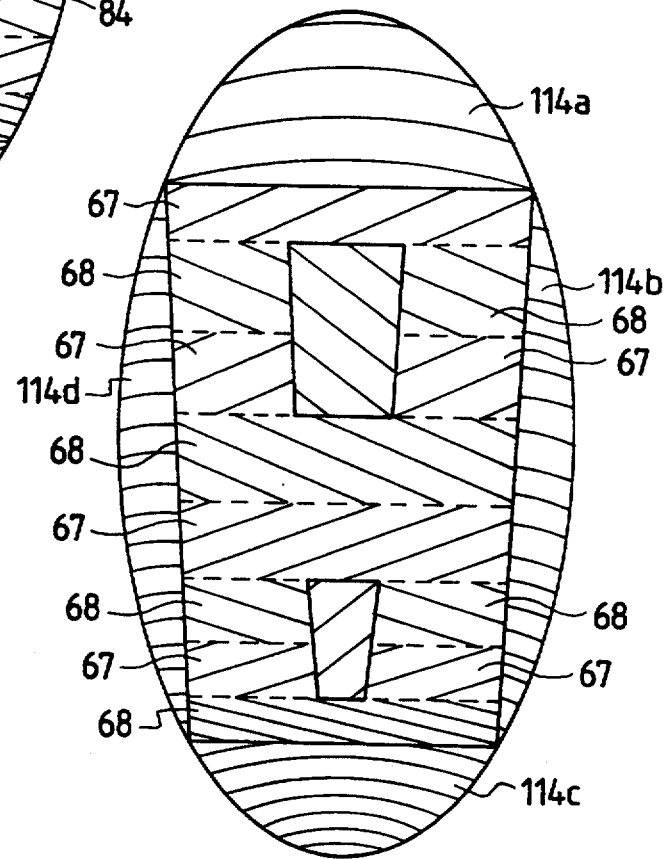
FIG. 19 is a plan view of a blazed hologram utilized in an optical head apparatus according to a modification of the fourth embodiment, showing a hologram pattern of the blazed hologram.

The blazed hologram 132 has a hologram pattern shown in FIG. 18 in cases where the optical head apparatus 131 is operated according to a concept of the second embodiment in which the transmission type of blazed hologram 82 is utilized. Also, the blazed hologram 132 has a hologram pattern shown in FIG. 19 in cases where the optical head apparatus 131 is operated according to a concept of the fourth embodiment in which the transmission type of blazed hologram 102 is utilized.

In the above configuration, the housing 133 is moved by the actuator 134 to adjust the position of the objective lens 65 according to the focus error signal $S_{fe}$ and the tracking error signal $S_{tr}$. In this case, the positional relation among the light beam source 62, the apparatus 66, the base 122, the blazed hologram 132 and the objective lens 65 is not changed because those elements are integrally arranged in the housing 133.

Therefore, even though the objective lens 65 is moved in the radial direction according to the tracking error signal $S_{tr}$, the positional relation between the light beam source 62 and the objective lens 65 is not changed. As a result, any comatic aberration does not occur.

Accordingly, a small-sized and lightweight optical head apparatus can be manufactured.

Next, an optical information apparatus for optically reading or storing information from/to the storage medium with the optical head apparatus 61, 81, 91, 101, 111, 121, or 131.

Figure 21:
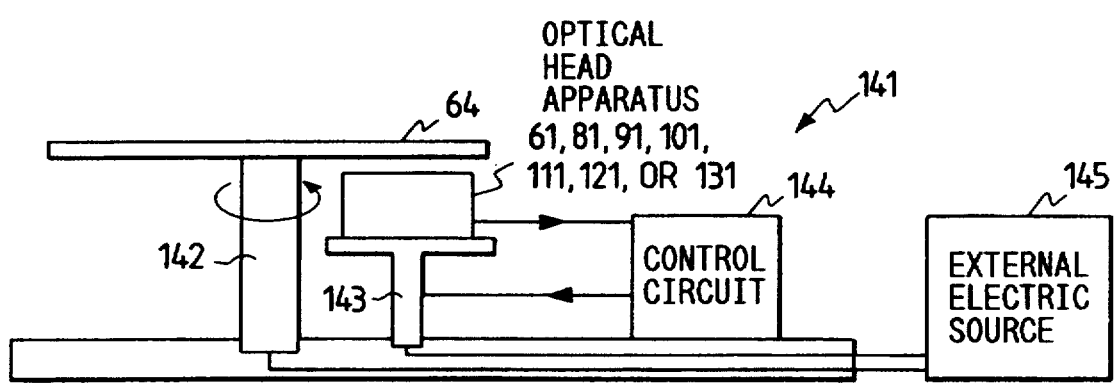
FIG. 21 is a constitutional view of an optical information apparatus according to an eight embodiment of the present invention.

FIG. 21 is a constitutional view of an optical information apparatus according to an eight embodiment.

As shown in FIG. 21, an optical information apparatus 141 comprises the optical head apparatus 61 (or 81, 91, 101, 111, 121, 131), an information medium driving mechanism 142 for rotating the information medium 64, an optical head driving apparatus 143 for roughly positioning the objective lens 65 of the apparatus 61 on a track pit of the information medium 64, a control circuit 144 for generating a control signal according to a focus error signal $S_{fe}$ and a tracking error signal $S_{tr}$ generated in the apparatus 61, and an external electric source 145 for supplying electric current to the information medium driving mechanism 142 and the optical head driving apparatus 143.

In the above configuration, the information medium 64 is initially rotated by the information medium driving mechanism 142. Thereafter, the apparatus 61 is moved by the optical head driving apparatus 143 so that the objective lens 65 is roughly positioned on a track pit of the information medium 64. Thereafter, a focus error signal $S_{fe}$ and a tracking error signal $S_{tr}$ are generated in the apparatus 61, and a control signal is generated in the control circuit 144 according to the focus error signal $S_{fe}$ and the tracking error signal $S_{tr}$. Thereafter, the objective lens 65 is precisely positioned on the track pit under the control of the control signal with the optical head driving apparatus 143. Therefore, information indicated by the track pit can be read. Also, a piece of information can be written in a track of the information medium 64 in the same manner.

Accordingly, because the optical head apparatus 61, 81, 91, 101, 111, 121, or 131 is utilized in the optical information apparatus 141 to obtain an information signal $S_{in}$ with a superior S/N ratio, the information stored in the information medium 64 can be stably reproduced with high accuracy.

Also, because the optical head apparatus 61, 81, 91, 101, 111, 121, or 131 is lightweight in a small size, the optical information apparatus 141 can be lightweight in a small size, and access time is shortened.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An optical head apparatus for reading pieces of original information from an information medium in which a series of patterned track pits indicating the original information is formed, comprising:
   a light beam source for radiating a light beam;
   a hologram having a hologram pattern for mainly changing the light beam radiated from the light beam source to zero-order diffraction light and secondarily diffracting the light beam radiated from the light beam source to produce unnecessary light, the hologram functioning as a lens for the unnecessary light and functioning as a flat plate for the zero-order diffraction light;
   an optical converging instrument for optically converging the zero-order diffraction light mainly occurring in the hologram at a patterned track pit of the information medium in a focus condition and optically defocusing the unnecessary light diffracted in the hologram on the information medium,
   the hologram diffracting and changing the zero-order diffraction light converged at the patterned track pit of the information medium to first-order diffraction light, and diffracting the unnecessary light defocused on the information medium; and
   a photo detecting instrument for detecting main intensity of the first-order diffraction light diffracted in the hologram and detecting secondary intensity of the unnecessary light diffracted in the hologram, the original information stored in the information medium being reproduced by the main intensity of the first-order diffraction light, and the secondary intensity of the unnecessary light being changed to a piece of averaged information functioning as noise which does not adversely influence the original information reproduced by the main intensity of the first-order diffraction light.

2. An apparatus according to claim 1 in which the photo detecting instrument comprises a multi-division photo detector having a plurality of detecting sections to which the first-order diffraction light is radiated on condition that the hologram pattern of the hologram functioning as a lens is defocused on the multi-division photo detector, means for producing a focus servo signal according to a mutual relation among intensities of the first-order diffraction light detected in the detecting sections of the multi-division photo detector, and means for adjusting a position of the optical converging instrument by the focus servo signal to focus the optical converging instrument on the information medium.

3. An optical information apparatus for optically reading original information with the optical head apparatus of the claim 2, comprising:
   an information medium driving mechanism for rotating the information medium;
   an external electric source for supplying driving power to the information medium driving mechanism;
   an optical head driving apparatus for roughly positioning the optical converging instrument of the optical head apparatus on a desired track pit of the information medium; and
   a control circuit for generating a control signal according to the focus servo signal produced in the multi-division photo detector and precisely positioning the optical converging instrument of the optical head apparatus on the desired track pit of the information medium under the control of the control signal.

4. An apparatus according to claim 1 in which
   the hologram additionally includes a first tracking error detecting diffraction region for diffracting the zero-order diffraction light converged at the patterned track pit of the information medium to produce a first beam of the first-order diffraction light, and a second tracking error detecting diffraction region for diffracting the zero-order diffraction light converged at the patterned track pit of the information medium to produce a second beam of the first-order diffraction light; and
   the photo detecting instrument additionally includes a first tracking error photo detector for detecting intensity of the first beam of the first-order diffraction light diffracted in the first tracking error detecting diffraction region, a second tracking error photo detector for detecting intensity of the second beam of the first-order diffraction light diffracted in the second tracking error detecting diffraction region,
   means for producing a tracking servo signal according to a mutual relation between the intensity of the first beam of the first-order diffraction light detected in the first tracking error photo detector and the intensity of the second beam of the first-order diffraction light detected in the second tracking error photo detector, and means for adjusting a position of the optical converging instrument in a radial direction of the optical converging instrument according to the tracking servo signal.

5. An apparatus according to claim 4 in which both the first tracking error detecting diffraction region and the second tracking error detecting diffraction region additionally included in the hologram function as a lens for the first and second beams of the first-order diffraction light radiated to the photo detecting instrument and the unnecessary light radiated to the information medium and function as a transparent plate for the zero-order diffraction light, the unnecessary light being defocused on the information medium.

6. An optical information apparatus for optically reading original information with the optical head apparatus of the claim 4, comprising:
   an information medium driving mechanism for rotating the information medium;
   an external electric source for supplying driving power to the information medium driving mechanism;
   an optical head driving apparatus for roughly positioning the optical converging instrument of the optical head apparatus on a desired track pit of the information medium; and
   a control circuit for generating a control signal according to the tracking servo signal produced in the photo detecting instrument and precisely positioning the optical converging instrument of the optical head apparatus on the desired track pit of the information medium under the control of the control signal.

7. An apparatus according to claim 1 in which
   the hologram comprises a central diffraction region for diffracting the zero-order diffraction light which is radiated to the information medium and mainly includes low-spatial-frequency components indicating a piece of original information stored in the information medium with low density, and a periphery diffraction region for diffracting the zero-order diffraction light which is radiated to the information medium and mainly includes high-spatial-frequency components indicating a piece of original information stored in the information medium with high density, the unnecessary light reflected by the information medium intending to be diffracted in the central diffraction region of the hologram; and
   the photo detecting instrument comprises a low-spatial-frequency photo detector for detecting first main intensity of the first-order diffraction light diffracted in the central diffraction region of the hologram, and a high-spatial-frequency photo detector for detecting second main intensity of the first-order diffraction light diffracted in the peripheral diffraction region of the hologram.

8. An apparatus according to claim 7 in which the photo detecting instrument additionally includes an electric circuit for obtaining total intensity of the first-order diffraction light by adding the first main intensity and weighted intensity defined as the second main intensity weighted with a weighting factor, the original information stored in the information medium being reproduced with the total intensity of the first-order diffraction light.

9. An apparatus according to claim 7 in which the peripheral diffraction region of the hologram functions as a lens for the unnecessary light and functions as a flat plate for the zero-order diffraction light, the unnecessary light being defocused on the information medium by the optical converging instrument.

10. An apparatus according to claim 7 in which the peripheral diffraction region of the hologram is partitioned into a plurality of sub-partitioned peripheral diffraction regions to reduce a numerical aperture of the peripheral diffraction region to a reduced numerical aperture of each of the sub-partitioned peripheral diffraction regions, the unnecessary light diffracted in the sub-partitioned peripheral diffraction regions being widened according to the reduced numerical apertures and being radiated to the information medium so as not to converge the unnecessary light at a single patterned track pit of the information medium.

11. An apparatus according to claim 10 in which the sub-partitioned peripheral diffraction regions of the peripheral diffraction region respectively function as a lens for the unnecessary light and respectively function as a transparent plate for the zero-order diffraction light, the unnecessary light being defocused on the information medium by the optical converging instrument.

12. An apparatus according to claim 10 in which grating vectors of the sub-partitioned peripheral diffraction regions differ from one another.

13. An apparatus according to claim 12 in which an absolute value of a difference between the grating vectors is over $5 \ \mu m \times 2\pi/(f^*\lambda)$ to set a distance between spots of the unnecessary light formed on the information medium to over 5 $\mu m$ on condition that a converging spot of the zero-order diffraction light formed on the information medium is less than 1 $\mu m$ in diameter of full width at half maximum, where the symbol $\pi$ denotes a ratio of the circumference of a circle to its diameter, the symbol f denotes the focal length of the optical converging instrument, and the symbol $\lambda$ denotes the wavelength of the light beam.

14. An apparatus according to claim 1 in which the unnecessary light is formed by N-order diffraction light (N is an integer except zero).

15. An apparatus according to claim 1 in which the optical converging instrument is integrally formed with the hologram.

16. An apparatus according to claim 1 in which the optical converging instrument is an objective lens.

17. An apparatus according to claim 1 in which the light beam source is a semiconductor laser.

18. An apparatus according to claim 1 in which a surface of the hologram is formed in echelon shape.

19. An apparatus according to claim 1 in which the light beam source and the photo detecting instrument are in a housing.

20. An apparatus according to claim 1 in which the light beam source is in a housing, and the hologram is integrally formed with the housing.

21. An apparatus according to claim 1 in which the hologram is of a transmission type.

22. An apparatus according to claim 1 in which the hologram is of a reflection type.

23. An apparatus according to claim 1 in which the hologram pattern of the hologram is blazed to have a blazed pattern.

24. An optical head apparatus for reading pieces of original information from an information medium in which a series of patterned track pits indicating the original information is formed, comprising:
   a light beam source for radiating a light beam;
   a hologram partitioned into at least six diffraction regions for mainly changing the light beam radiated from the light beam source to a beam of zero-order diffraction light and secondarily diffracting the light beam radiated from the light beam source in each of the diffraction regions to produce at least six beams of unnecessary light, a reduced numerical aperture of each of the diffraction regions being smaller than a numerical aperture of the hologram, and the beams of unnecessary light diffracted in the diffraction regions being respectively widened;

an optical converging instrument for optically converging the zero-order diffraction light mainly occurring in the hologram at a patterned track pit of the information medium in a focus condition and radiating each of the beams of the unnecessary light widened in the diffraction regions of the hologram to the information medium so as not to converge each of the beams of the unnecessary light at a single patterned track pit of the information medium, the hologram diffracting and changing the zero-order diffraction light converged at the patterned track pit of the information medium to first-order diffraction light, and diffracting the beams of the unnecessary light not converged at the single patterned track pit of the information medium; and a photo detecting instrument for detecting main intensity of the first-order diffraction light diffracted in the hologram and detecting secondary intensities of the beams of the unnecessary light diffracted in the hologram, the original information stored in the information medium being reproduced by the main intensity of the first-order diffraction light, and the secondary intensities of the beams of the unnecessary light being changed to a piece of averaged information functioning as noise which does not adversely influence the original information reproduced by the main intensity of the first-order diffraction light.

25. An apparatus according to claim 24 in which the photo detecting instrument comprises a multi-division photo detector having a plurality of detecting sections to which the first-order diffraction light is radiated, means for producing a focus servo signal according to a mutual relation among intensities of the first-order diffraction light detected in the detecting sections of the multi-division photo detector, and means for adjusting a position of the optical converging instrument according to the focus servo signal to focus the first-order diffraction light on the information medium with the optical converging instrument.

26. An optical information apparatus for optically reading original information with the optical head apparatus of the claim 25, comprising:
an information medium driving mechanism for rotating the information medium;
an external electric source for supplying driving power to the information medium driving mechanism;
an optical head driving apparatus for roughly positioning the optical converging instrument of the optical head apparatus on a desired track pit of the information medium; and
a control circuit for generating a control signal according to the focus servo signal produced in the multi-division photo detector and precisely positioning the optical converging instrument of the optical head apparatus on the desired track pit of the information medium under the control of the control signal.

27. An apparatus according to claim 24 in which each of the diffraction regions of the hologram functions as a lens for the unnecessary light and functions as a transparent plate for the zero-order diffraction light, the beams of the unnecessary light being respectively defocused on the information medium by the optical converging instrument.

28. An apparatus according to claim 24 in which
the hologram additionally includes a first tracking error detecting diffraction region for diffracting the zero-order diffraction light converged at the patterned track pit of the information medium to produce a first beam of the first-order diffraction light, and a second tracking error detecting diffraction region for diffracting the zero-order diffraction light converged at the patterned track pit of the information medium to produce a second beam of the first-order diffraction light; and
the photo detecting instrument additionally includes a first tracking error photo detector for detecting intensity of the first beam of the first-order diffraction light diffracted in the first tracking error detecting diffraction region, a second tracking error photo detector for detecting intensity of the second beam of the first-order diffraction light diffracted in the second tracking error detecting diffraction region,
means for producing a tracking servo signal according to a mutual relation between the intensity of the first beam of the first-order diffraction light detected in the first tracking error photo detector and the intensity of the second beam of the first-order diffraction light detected in the second tracking error photo detector, and means for adjusting a position of the optical converging instrument in a radial direction of the optical converging instrument according to the tracking servo signal.

29. An apparatus according to claim 28 in which both the first tracking error detecting diffraction region and the second tracking error detecting diffraction region additionally included in the hologram function as a lens for the first and second beams of the first-order diffraction light radiated to the photo detecting instrument and the unnecessary light radiated to the information medium and function as a transparent plate for the zero-order diffraction light, the unnecessary light being defocused on the information medium.

30. An apparatus according to claim 28 in which
the first tracking error detecting diffraction region of the hologram is partitioned into at least six first sub-partitioned diffraction regions to reduce a numerical aperture of the first tracking error detecting diffraction region to a reduced first numerical aperture of each of the first sub-partitioned diffraction regions, and the second tracking error detecting diffraction region of the hologram is partitioned into at least six second sub-partitioned diffraction regions to reduce a numerical aperture of the second tracking error detecting diffraction region to a reduced second numerical aperture of each of the second sub-partitioned diffraction regions, the unnecessary light diffracted in each of the first sub-partitioned diffraction regions being widened and radiated to the information medium so as not to converge on a single patterned track pit of the information medium, and the unnecessary light diffracted in the second sub-partitioned diffraction regions being widened and radiated to the information medium so as not to converge on a single patterned track pit of the information medium; and
the first tracking error photo detector of the photo detecting instrument has at least six radiation portions to detect intensities of first beams of the first-order diffraction light diffracted by the first sub-partitioned diffraction regions, and the second tracking error photo detector of the photo detecting instrument has at least six radiation portions to detect intensities of second beams of the first-order diffraction light diffracted by the second sub-partitioned diffraction regions, intensity of the unnecessary light widened and not converged at the single patterned track pit of the information medium being detected by the first and second tracking error photo detectors of the photo detecting instrument.

31. An apparatus according to claim 30 in which the first and second sub-partitioned diffraction regions function as a lens for the first and second beams of the first-order diffraction light radiated to the photo detecting instrument and the unnecessary light radiated to the information medium, and function as a transparent plate for the zero-order diffraction light, the unnecessary light being defocused on the information medium.

32. An apparatus according to claim 30 in which grating vectors of the first sub-partitioned diffraction regions differ from one another, and grating vectors of the second sub-partitioned diffraction regions differ from one another.

33. An apparatus according to claim 32 in which an absolute value of a difference between the grating vectors is over 5 $\mu m \times 2\pi/(f^*\lambda)$ to set a distance between spots of the unnecessary light formed on the information medium to over 5 $\mu m$ on condition that a converging spot of the zero-order diffraction light formed on the information medium is less than 1 $\mu m$ in diameter of full width at half maximum, where the symbol $\pi$ denotes a ratio of the circumference of a circle to its diameter, the symbol f denotes the focal length of the optical converging instrument, and the symbol $\lambda$ denotes the wavelength of the light beam.

34. An optical information apparatus for optically reading original information with the optical head apparatus of the claim 28, comprising:
an information medium driving mechanism for rotating the information medium;
an external electric source for supplying driving power to the information medium driving mechanism;
an optical head driving apparatus for roughly positioning the optical converging instrument of the optical head apparatus on a desired track pit of the information medium; and
a control circuit for generating a control signal according to the tracking servo signal produced in the photo detecting instrument and precisely positioning the optical converging instrument of the optical head apparatus on the desired track pit of the information medium under the control of the control signal.

35. An apparatus according to claim 24 in which the hologram additionally includes a periphery diffraction region surrounding the diffraction regions for diffracting the zero-order diffraction light which is radiated to the information medium and mainly includes high-spatial-frequency components indicating a piece of original information stored in the information medium with high density, the unnecessary light reflected by the information medium intending to be diffracted in the diffraction regions of the hologram; and
the photo detecting instrument comprises a low-spatial-frequency detector for detecting the main intensity of the first-order diffraction light diffracted in the diffraction regions of the hologram, and a high-spatial-frequency detector for detecting peripheral intensity of the first-order diffraction light diffracted in the peripheral diffraction region of the hologram.

36. An apparatus according to claim 35 in which the photo detecting instrument additionally includes an electric circuit for obtaining total intensity of the first-order diffraction light by adding the main intensity and weighted intensity defined as the peripheral intensity weighted with a weighing factor, the original information stored in the information medium being reproduced according to the total intensity of the first-order diffraction light.

37. An apparatus according to claim 35 in which the peripheral diffraction region of the hologram functions as a lens for the unnecessary light and functions as a flat plate for the zero-order diffraction light, the unnecessary light being defocused on the information medium by the optical converging instrument.

38. An apparatus according to claim 35 in which the peripheral diffraction region of the hologram is partitioned into at least six sub-partitioned peripheral diffraction regions to reduce a numerical aperture of the peripheral diffraction region to a reduced numerical aperture of each of the sub-partitioned peripheral diffraction regions, the unnecessary light diffracted in each of the sub-partitioned peripheral diffraction regions being widened and radiated to the information medium so as not to converge at a single patterned track pit of the information medium.

39. An apparatus according to claim 38 in which the sub-partitioned peripheral diffraction regions of the peripheral diffraction region respectively function as a lens for the unnecessary light and respectively function as a transparent plate for the zero-order diffraction light, the unnecessary light being defocused on the information medium by the optical converging instrument.

40. An apparatus according to claim 38 in which grating vectors of the sub-partitioned peripheral diffraction regions differ from one another.

41. An apparatus according to claim 40 in which an absolute value of a difference between the grating vectors is over 5 $\mu m \times 2\pi/(f^*\lambda)$ to set a distance between spots of the unnecessary light formed on the information medium to over 5 $\mu m$ on condition that a converging spot of the zero-order diffraction light formed on the information medium is less than 1 $\mu m$ in diameter of full width at half maximum, where the symbol $\pi$ denotes a ratio of the circumference of a circle to its diameter, the symbol f denotes the focal length of the optical converging instrument, and the symbol $\lambda$ denotes the wavelength of the light beam.

42. An apparatus according to claim 24 in which grating vectors of the diffraction regions differ from one another.

43. An apparatus according to claim 42 in which an absolute value of a difference between the grating vectors is over 5 $\mu m \times 2\pi/(f^*80)$ to set a distance between spots of the unnecessary light formed on the information medium to over 5 $\mu m$ on condition that a converging spot of the zero-order diffraction light formed on the information medium is less than 1 $\mu m$ in diameter of full width at half maximum, where the symbol $\pi$ denotes a ratio of the circumference of a circle to its diameter, the symbol f denotes the focal length of the optical converging instrument, and the symbol λ denotes the wavelength of the light beam.

44. An apparatus according to claim 24 in which the unnecessary light is formed by N-order diffraction light (N is an integer except zero).

45. An apparatus according to claim 24 in which the optical converging instrument is integrally formed with the hologram.

46. An apparatus according to claim 24 in which the optical converging instrument is an objective lens.

47. An apparatus according to claim 24 in which the light beam source is a semiconductor laser.

48. An apparatus according to claim 24 in which a surface of the hologram is formed in echelon shape.

49. An apparatus according to claim 24 in which the light beam source and the photo detecting instrument are in a housing.

50. An apparatus according to claim 24 in which the light beam source is in a housing, and the hologram is integrally formed with the housing.

51. An apparatus according to claim 24 in which the hologram is of a transmission type.

52. An apparatus according to claim 24 in which the hologram is of a reflection type.

53. An apparatus according to claim 24 in which the hologram pattern of the hologram is blazed to have a blazed pattern.

54. A method for reproducing original information indicated by patterned track pits which are stored in an information medium, comprising the steps of:
   forming a hologram pattern of a hologram to function as a lens for light diffracted in the hologram;
   radiating a light beam to the hologram to mainly change the light beam to zero-order diffraction light and to secondarily change the light beam to unnecessary light produced by diffracting the light beam in the hologram functioning as a lens;
   optically converging the zero-order diffraction light at a patterned track pit of the information medium in a focus condition to read a piece of original information indicated by the patterned track pit, the zero-order diffraction light being reflected by the information medium;
   defocusing the unnecessary light diffracted in the hologram functioning as a lens on the information medium so as not to optically converge the unnecessary light at a single patterned track pit of the information medium for the purpose of reading pieces of unnecessary original information, the unnecessary light being reflected by the information medium;
   diffracting the zero-order diffraction light reflected by the information medium in the hologram to produce first-order diffraction light;
   diffracting the unnecessary light reflected by the information medium in the hologram;
   detecting a main intensity of the first-order diffraction light to reproduce the original information indicated by the patterned track pit; and
   detecting a secondary intensity of the unnecessary light diffracted in the hologram to reproduce a piece of averaged information from the unnecessary original information, the averaged information functioning as noise which does not adversely influence the original information reproduced.

55. A method according to claim 54 in which the step of forming a hologram pattern includes:
   adjusting a focal length of the hologram functioning as a lens for the unnecessary light to form a defocusing spot of the unnecessary light having a diameter over 5 μm on the information medium in the step of defocusing the unnecessary light.

56. A method for reproducing original information indicated by patterned track pits which are stored in an information medium, comprising the steps of:
   dividing a hologram into a plurality of diffraction regions to reduce a numerical aperture of the hologram to a reduced numerical aperture of each of the diffraction regions;
   radiating a light beam to the hologram to mainly change the light beam to a beam of zero-order diffraction light and to secondarily change the light beam to a plurality of beams of unnecessary light produced by diffracting the light beam in the diffraction regions, the beams of unnecessary light being respectively widened according to the reduced numerical apertures of the diffraction regions of the hologram;
   optically converging the zero-order diffraction light at a patterned track pit of the information medium in a focus condition to read a piece of original information indicated by the patterned track pit, the zero-order diffraction light being reflected by the information medium;
   radiating each beam of the unnecessary light widened in the hologram to the information medium so as not to optically converge each beam of the unnecessary light at a single patterned track pit of the information medium to read pieces of unnecessary original information, the beams of the unnecessary light being reflected by the information medium;
   diffracting the zero-order diffraction light reflected by the information medium in the hologram to produce first-order diffraction light;
   diffracting the beams of the unnecessary light reflected by the information medium in the hologram;
   detecting a main intensity of the first-order diffraction light to reproduce the original information indicated by the patterned track pit; and
   detecting secondary intensities of the beams of the unnecessary light diffracted in the hologram to reproduce a piece of averaged information from the unnecessary original information for each beam of the unnecessary light, the averaged information functioning as noise which does not adversely influence the original information reproduced.

57. A method according to claim 56 in which the step of dividing a hologram includes:
   adjusting the reduced numerical aperture of each of the diffraction regions to form a defocusing spot of the unnecessary light having a diameter over 5 μm on the information medium in the step of radiating each beam of the unnecessary light.

* * * * *